US012388719B2

(12) United States Patent
Barber et al.

(10) Patent No.: US 12,388,719 B2
(45) Date of Patent: Aug. 12, 2025

(54) CREATING A GLOBAL REINFORCEMENT LEARNING (RL) MODEL FROM SUBNETWORK RL AGENTS

(71) Applicant: Ciena Corporation, Hanover, MD (US)

(72) Inventors: Christopher Barber, Ottawa (CA); Sa'di Altamimi, Nepean (CA); Shervin Shirmohammadi, Ottawa (CA); David Côté, Gatineau (CA)

(73) Assignee: Ciena Corporation, Hanover, MD (US)

( * ) Notice: Subject to any disclaimer, the term of this patent is extended or adjusted under 35 U.S.C. 154(b) by 393 days.

(21) Appl. No.: 18/119,586

(22) Filed: Mar. 9, 2023

(65) Prior Publication Data
US 2023/0216747 A1 Jul. 6, 2023

Related U.S. Application Data

(63) Continuation-in-part of application No. 17/166,383, filed on Feb. 3, 2021, now Pat. No. 11,637,742.

(51) Int. Cl.
*H04L 41/16* (2022.01)
*H04L 41/12* (2022.01)

(52) U.S. Cl.
CPC .............. *H04L 41/16* (2013.01); *H04L 41/12* (2013.01)

(58) Field of Classification Search
CPC .......... G06N 3/006; G06N 3/02; G06N 3/042; G06N 3/044; G06N 3/0442; G06N 3/045; G06N 3/0455; G06N 3/0464; G06N 3/0475; G06N 3/0499; G06N 3/08; G06N 3/088; G06N 3/09; G06N 3/091; G06N 3/092;

(Continued)

(56) References Cited

U.S. PATENT DOCUMENTS 9,197,565 B2   11/2015   Khanchi et al.
9,924,392 B2    3/2018   Côté et al.
(Continued)

OTHER PUBLICATIONS

Li et al., Applications of Multi-Agent Reinforcement Learning in Future Internet: A Comprehensive Survey, IEEE, 40 pages, 2022.*

(Continued)

*Primary Examiner* — Frank Duong
(74) *Attorney, Agent, or Firm* — Baratta Law PLLC; Lawrence A. Baratta, Jr.

(57) ABSTRACT

Methods are provided for recommending actions to improve operability of a network. In one implementation, a method includes acknowledging a plurality of subnetworks in a whole network, each subnetwork including multiple nodes and being represented by a tunnel group having multiple end-to-end tunnels through the subnetwork. The method also includes selecting a first group of subnetworks from the plurality of subnetworks and generating a Reinforcement Learning (RL) agent for each subnetwork of the first group. Each RL agent is based on observations of end-to-end metrics of the end-to-end tunnels of the respective subnetwork. The observations are independent of specific topology information of the subnetwork. Also, the method includes training a global model based on the RL agents of the first group of subnetworks and applying the global model to an Action Recommendation Engine (ARE) configured for recommending actions that can be taken to improve a state of the whole network.

20 Claims, 12 Drawing Sheets

(58) Field of Classification Search
CPC .......... G06N 3/096; G06N 3/126; G06N 7/01;
G06N 20/00; G06N 20/10; H04B
17/3912; H04B 17/3913; H04L 25/0254;
H04L 25/03165; H04L 41/40; H04L
41/046; H04L 41/0654; H04L 41/0893;
H04L 41/12; H04L 41/122; H04L 41/145;
H04L 41/16; H04L 41/5009; H04L
41/5067; H04L 43/08; H04L 43/55; H04L
45/08; H04L 2012/05686; H04L
2025/03464; H04J 14/0284; H04W 16/22
See application file for complete search history.

(56) References Cited

U.S. PATENT DOCUMENTS

| | | | |
|---|---|---|---|
| 10,050,868 | B2 | 8/2018 | Porras et al. |
| 10,171,161 | B1 | 1/2019 | Côté et al. |
| 10,623,277 | B2 | 4/2020 | Djukic et al. |
| 10,841,181 | B2 | 11/2020 | Côté et al. |
| 11,102,238 | B2 | 8/2021 | Ackerman et al. |
| 12,192,820 | B2 * | 1/2025 | Yeh .................... G06N 3/045 |
| 2002/0188936 | A1 | 12/2002 | Bojanic et al. |
| 2014/0092204 | A1 | 4/2014 | Javadtalab et al. |
| 2017/0063599 | A1 | 3/2017 | Wu et al. |
| 2018/0034922 | A1 | 2/2018 | Gopalan |
| 2018/0248905 | A1 | 8/2018 | Côté et al. |
| 2019/0138948 | A1 | 5/2019 | Janulewicz et al. |
| 2019/0280942 | A1 | 9/2019 | Côté et al. |
| 2019/0303726 | A1 | 10/2019 | Côté et al. |
| 2019/0349287 | A1 | 11/2019 | Chandra Sekar Rao et al. |
| 2020/0082013 | A1 | 3/2020 | Triplet et al. |
| 2020/0259700 | A1 | 8/2020 | Bhalla et al. |
| 2020/0259717 | A1 | 8/2020 | Ong et al. |
| 2020/0287788 | A1 | 9/2020 | Triplet et al. |
| 2021/0385135 | A1 | 12/2021 | Côté et al. |
| 2022/0109622 | A1 * | 4/2022 | Yeh .................... H04L 69/40 |
| 2022/0124543 | A1 * | 4/2022 | Orhan .................. G06N 3/006 |
| 2022/0124560 | A1 * | 4/2022 | Yeh .................... H04L 41/5025 |
| 2022/0245441 | A1 * | 8/2022 | Dechene .............. H04L 45/08 |

OTHER PUBLICATIONS

Altamimi, Automating Network Operation Centers using Reinforcement Learning, Thesis, University of Ottawa, 99 pages, 2023.*

Altamimi et al., Toward a Superintelligent Action Recommender for Network Operation Centers Using Reinforcement Learning, IEEE, 14 pages, Mar. 2, 2023.*

Mohammed et al., A Machine-Learning-Based Action Recommender for Network Operation Centers, IEEE, 12 pages, Sep. 2021.*

Gu et al., "Machine Learning for Intelligent Optical Networks: A Comprehensive Survey", Beijing Laboratory of Advanced Information Network, Beijing University of Posts and Telecommunications (BUPT), arXiv:2003.05290v1 [cs.NI], Apr. 2, 2020, pp. 1-42.

Blum, "Network Operations Centers," Lucent Technologies, Jan. 22, 2001, 20 pages.

Qin et al., "NeoRL: A Near Real-World Benchmark for Offline Reinforcement Learning," arXiv, Feb. 8, 2021, 29 pages.

Mohammed et al., "Machine Learning and Deep Learning Based Traffic Classification and Prediction in Software Defined Networking," IEEE, 2019, 6 pages.

Mohammed et al., "A Machine-Learning-Based Action Recommender for Network Operation Centers," IEEE, vol. 18, No. 3, Sep. 2021, 12 pages.

Mohammed, "Artificial Intelligence in Computer Networks: Delay Estimation, Fault Detection, and Network Automation," Thesis, University of Ottawa, 2021, 95 pages.

Altamimi, "Towards Superintelligence-Driven Autonomous Network Operation Centers Using Reinforcement Learning," Thesis, University of Ottawa, 2021, 66 pages.

* cited by examiner

CREATING A GLOBAL REINFORCEMENT LEARNING (RL) MODEL FROM SUBNETWORK RL AGENTS

CROSS-REFERENCE TO RELATED APPLICATION

The present application is a continuation-in-part of U.S. application Ser. No. 17/166,383, filed Feb. 3, 2021, entitled "Action Recommendation Engine (ARE) for Network Operations Center (NOC) solely from raw un-labeled data," the contents of which are incorporated by reference herein.

TECHNICAL FIELD

The present disclosure generally relates to networking systems and methods. More particularly, the present disclosure relates to creating a global, or network-wide, Reinforcement Learning (RL) model from RL agents computed at one or more subnetworks and utilizing the global RL model for recommending network actions.

BACKGROUND

Current software products are unable to adequately provide useful guidance or recommendations about how, when, and where actions are taken on a network. However, some professional services are able to provide some partial compensation in this regard.

Across the industry, closed-loop automation software in use today is generally based on expert rules. This approach can work for relatively simple cases if programmers have domain expertise. However, determining effective rules for more complex scenarios can become incrementally difficult. Also, many software products do not work for multi-vendor or multi-domain scenarios since codifying collective domain expertise into explicit rules can get incrementally difficult and expensive.

In some scenarios, an Action Recommendation Engine (ARE) may be used by taking explicit network states as an input to supervised Machine Learning (ML). The states of the network or states of the network elements may be provided as training and testing data sets. This data in this respect may come from external labeling.

A services team (e.g., a Network Operations Center (NOC)) may generally be able to provide effective guidance about how, when, and where to act on a network, but at the expense of lots of time and resources. Also, this process may be tedious and expensive. Furthermore, expert rules do not work well for complex scenarios where determining good rules gets incrementally difficult. Also, expert rules do not work for multi-vendor or multi-domain scenarios where codifying collective domain expertise into explicit rules gets incrementally difficult and expensive. First, an ARE version may require the network state as input. Determining the network state can be difficult or expensive, or the state may be ill-defined, which was a weakness of the earlier ARE. Therefore, there is a need in the field of NOCs or the like to provide AREs that can overcome some of the issues of previous solutions.

BRIEF SUMMARY

The present disclosure is directed to various systems, methods, and computer-readable media configured to provide recommended actions that can be taken to improve the operability of a network, such as recommending the use of various tunnels for transmitting data packets through a communications network. According to one implementation, a process includes the step of acknowledging (or recognizing) a plurality of subnetworks in a whole network. This step may include virtually splitting up a network into multiple subnetworks. In this embodiment, each subnetwork includes a plurality of nodes and may be represented by a "tunnel group" having a plurality of end-to-end tunnels through the respective subnetwork. The process also includes the step of selecting a first group of subnetworks from the plurality of subnetworks. Next, the process includes generating a Reinforcement Learning (RL) agent for each subnetwork of the first group. Each RL agent, in this embodiment, is based on observations of end-to-end metrics of the end-to-end tunnels of the respective subnetwork. Also, the observations are independent of specific topology information of the respective subnetwork. The process further includes the step of training a global model based on the RL agents of the first group of subnetworks. In addition, the process includes applying the global model to an Action Recommendation Engine (ARE) configured for recommending actions that can be taken to improve a state of the whole network.

Before the step of applying the global model to the ARE, the process may further include the step of testing the global model on a second group of subnetworks selected from the plurality of subnetworks and make changes accordingly. For example, based on the testing of the global model, the process may be configured to tune or retrain one or more of the RL agents and/or the global model as needed. Furthermore, the process may include the steps of a) matching the remaining subnetworks with the first group of subnetworks based on similarities in topology and b) applying the RL agents of the first group of subnetworks to the remaining subnetworks that match the first group of subnetworks. The steps of training and testing are performed on one or more of a real-world network, a virtual network, and a simulated network.

The observations described herein may be based on one or more of tickets, logs, user feedback, expert rules, and simulator output. The step of generating the RL agent for each subnetwork may include a) using one or more of an online RL technique and an offline RL technique and b) iterating the step of generating the RL agent one or more times based on additional observations of end-to-end metrics. In some embodiments, the end-to-end metrics described herein may be related to Key Performance Indicator (KPI) metrics. Additionally, the end-to-end metrics may further be related to aggregated information associated with a topology of the respective subnetwork. The aggregated information, for example, may include a) the number of hops along each tunnel, b) the number of nodes along each tunnel, and/or c) the cost of transmitting data traffic along each tunnel. The global model, according to various embodiments, may be a decentralized RL model.

The process may further include the step of providing the recommended action to a network engineer of a NOC that utilizes the ARE. With respect to each subnetwork, the end-to-end tunnels may be arranged from a client device to one or more servers associated with a video service provider. With respect to each of the one or more tunnel groups, the ARE may be configured to switch an end-to-end primary tunnel to an end-to-end secondary tunnel selected from one or more backup tunnels of the respective tunnel group in order to optimize traffic in the whole network. The whole network may include a training environment modeled as a Decoupled Partially-Observable Markov Decision Process (Dec-POMDP).

The observations that are independent of specific topology information may include observations independent of a) conditions of the nodes, b) conditions of links arranged between the nodes, and c) actions by other RL agents. The observations related to end-to-end metrics may include a) observations related to Quality of Service (QoS) metrics, b) delay, c) jitter, d) packet loss, e) Quality of Experience (QoE), f) bitrate, g) buffer level, h) startup delay, i) number of hops per tunnel, and/or j) number of nodes per tunnel. The step of training the global model may include calculating an RL reward based on a Quality of Experience (QoE) metric and an operating expense (OPEX) metric. In some embodiments, the process may include the steps of a) using the global model during inference or production in a real-world environment and b) using one or more of a tuning technique, a transfer learning technique, and a retraining technique to modify the global model as needed. Also, the training step may include normalizing the RL agents such that the number of actions and the meaning of each action is kept consistent.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
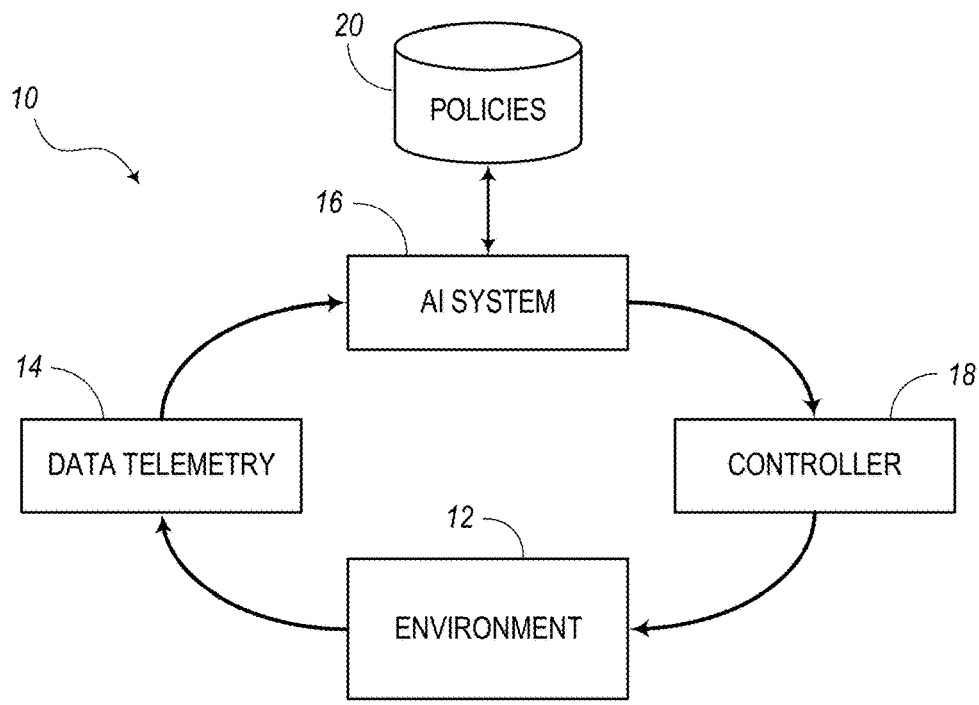
FIG. 1 is a block diagram of a feedback loop driven by Artificial Intelligence (AI) for adaptive control of an environment, according to various embodiments.

FIG. 1 is a block diagram of a feedback loop 10 driven by Artificial Intelligence (AI) for adaptive control of an environment 12 (e.g., a network or other suitable type of executable system). The environment 12 may include multiple components or sub-systems (e.g., network elements), which can be physical and/or virtual components. The AI-driven feedback loop 10 may include an AI system 16, which can receive data telemetry 14 from the environment 12. Based on predetermined policies 20, the AI system 16 can process the data telemetry 14 using data-driven training and inference models and then provide results to a controller 18 or orchestrator for control of the environment 12.

The controller 18 is configured to modify/update the components or sub-systems (e.g., network elements) of the environment 12 based on the feedback from the AI system 16. The AI system 16 can be a server, network controller, SDN application, cloud-based application, etc. The AI system 16 may include one or more processing device which receive inputs (e.g., data telemetry 14) and provides outputs to the controller 18 for automated control of the environment 12. The AI system 16 can also be referred to as an ML inference engine.

Various techniques for AI control, Machine Learning (ML), Reinforcement Learning (RL), etc., are contemplated. Some examples are described in commonly-assigned U.S. patent application Ser. No. 16/185,471, filed Nov. 9, 2018, and entitled "Reinforcement learning for autonomous telecommunications networks," U.S. Pat. No. 10,171,161, issued Jan. 1, 2019, and entitled "Machine learning for link parameter identification in an optical communications system," U.S. patent application Ser. No. 16/251,394, filed Jan. 18, 2019, and entitled "Autonomic resource partitions for adaptive networks," and U.S. patent application Ser. No. 15/896,380, filed Feb. 14, 2018, and entitled "Systems and methods to detect abnormal behavior in networks," the contents of each are incorporated by reference herein.

The AI-driven feedback loop 10 can play an instrumental role in adaptive network systems. Such systems need response time (i.e., time to compute the probability of an outcome given input data) to be fast for identifying an optimal action to be taken in order to change network/service state. This can be a complex decision that needs to consider input data patterns, network/service states, policies 20, etc.

Generally, two broad types of AI can be used to drive "closed loops" by the AI system 16, namely 1) supervised or unsupervised pattern-recognition algorithms used to understand what is happening in the environment 12 (e.g., see U.S. patent application Ser. No. 15/896,380 noted herein), and 2) reinforcement learning used to decide what actions should be taken on the environment 12 (see U.S. patent application Ser. No. 16/185,471 noted herein).

Figure 2:
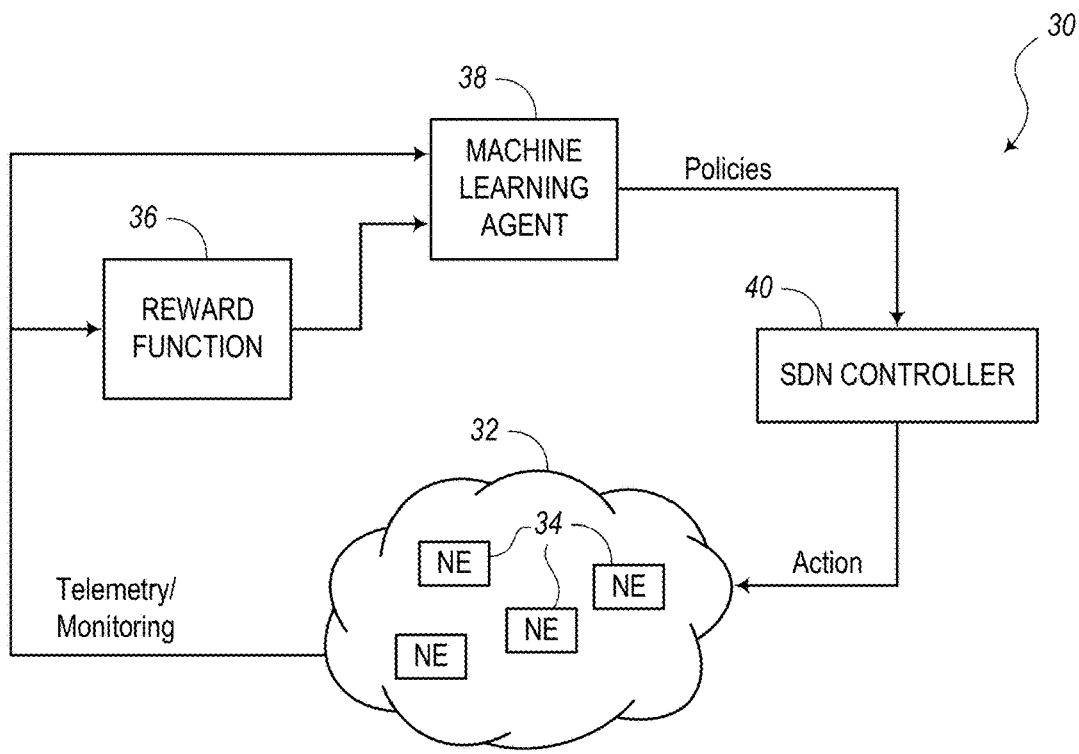
FIG. 2 is a block diagram of a Reinforcement Learning (RL) system, according to various embodiments.

FIG. 2 is a block diagram of a Reinforcement Learning (RL) system 30. Reinforcement Learning can be used for closed-loop applications where there may not be a need for human supervision and the AI system 16 can independently derive state information from an executable system or other controllable environment, and then decide on actions to affect that environment, e.g., a service or resource instance in a given network domain. In FIG. 2, the RL system 30 is arranged to control an executable system or environment, which, in this implementation, is configured as a network 32.

In the network environment, the network 32 may include a number of Network Elements (NEs) 34 (e.g., components, sub-systems, subnetworks, routers, switches, etc. of a communications network or other executable system). The NEs 34 may include physical and/or virtual elements. The physical network elements, for example, may include switches, routers, cross-connects, add-drop multiplexers, and the like. The virtual network elements can include Virtual Network Functions (VNFs) which can include virtual implementations of the physical network elements. The network 32 can include one or more layers including optical (Layer 0), TDM (Layer 1), packet (Layer 2), etc. In one embodiment, the NEs 34 can be nodal devices that may consolidate the functionality of a multi-service provisioning platform (MSPP), digital cross-connect (DCS), Ethernet and Optical Transport Network (OTN) switch, DWDM platform, etc. into a single, high-capacity intelligent switching system providing Layer 0, 1, 2, and/or 3 consolidation. In another embodiment, the NEs 34 can be any of an Add/Drop Multiplexer (ADM), a multi-service provisioning platform (MSPP), a digital cross-connect (DCS), an optical cross-connect, an optical switch, a router, a switch, a Wavelength Division Multiplexing (WDM) terminal, an access/aggregation device, etc. That is, the NEs 34 can be any system with ingress and egress signals and switching of packets, channels, timeslots, tributary units, wavelengths, etc. The network 32 can be viewed as having a data plane where network traffic operates and a control plane (or management plane) where control of the data plane is performed. The control plane provides data telemetry 14 during operation. The data telemetry 14 can include, without limitation, Operations, Administration, Maintenance, and Provisioning (OAM & P) data, Performance Monitoring (PM) data, alarms, and the like.

The network 32 provides telemetry and monitoring data to a reward function 36 and to an ML agent 38. The reward function 36 also provides an input to the ML agent 38. The ML agent 38 can be configured as the AI system 16 shown in FIG. 1, according to some embodiments, and may provide an interpreter function observing the network 32 via the telemetry and monitoring data for current state information and determining the actions required to achieve a target state. The reward function 36 is used by the ML agent 38 to maximize the probability, and thus reinforcing behavior, of achieving the target state.

Typically, the RL system 30 is initially trained on a large data set in order to give it a base set of operational policies for business/service/network target states to invoke or maintain based on the state of the network 32, then an inference model of the RL system 30 may continue to learn and refine its behavior as it is exposed to the real-world behaviors and may observe the results of its actions there. In some cases, the RL system 30 may need to experiment with an available set of possible actions constrained by operational policies while attempting to find the optimal action. In some cases, the operational policies themselves could be refined, i.e., dynamic policy, based on observed current state as well as actions taken in previous attempts.

In some embodiments, the RL system 30 may be configured to define costs and rewards to quantify network actions, determine allowed network actions, and define metrics describing a state of the network 32. The RL system 30 may obtain network data to determine a current state of the network 32 based on the defined metrics and determine one or more of the network actions based on the current state and based on minimizing the costs and/or maximizing the rewards. That is, RL includes rewards/costs which set an objective or goal. A state may be defined according to where the network 32 is relative to the objective/goal and what network actions may be performed to drive the state towards the objective/goal.

Other types of Machine Learning (ML) can be used to drive closed-loop network applications, notably: pattern-recognition and event-classification techniques such as Artificial Neural Networks (ANN) and others. In this case, a set of raw inputs from the telemetry and monitoring data can be turned into a higher-level insight about the network state, which in turn can be used to decide how to take actions to modify the network 32. For example, collections of performance monitoring data can be interpreted by an AI as: "there seems to be a congestion happening on link X affecting services ABC," "bandwidth allocated to service D should become under-utilized for the next 8 hours and could be used elsewhere," "behavior of device Y suggests a high risk of failure within next 2-3 days," etc. As a result, network policies could take automated actions such as, for example, re-routing low-priority away from link X, re-allocating some of the service D bandwidth to other services EFG, re-routing services away from device Y and open a maintenance ticket, etc.

Action Recommendation Systems

Figure 3:
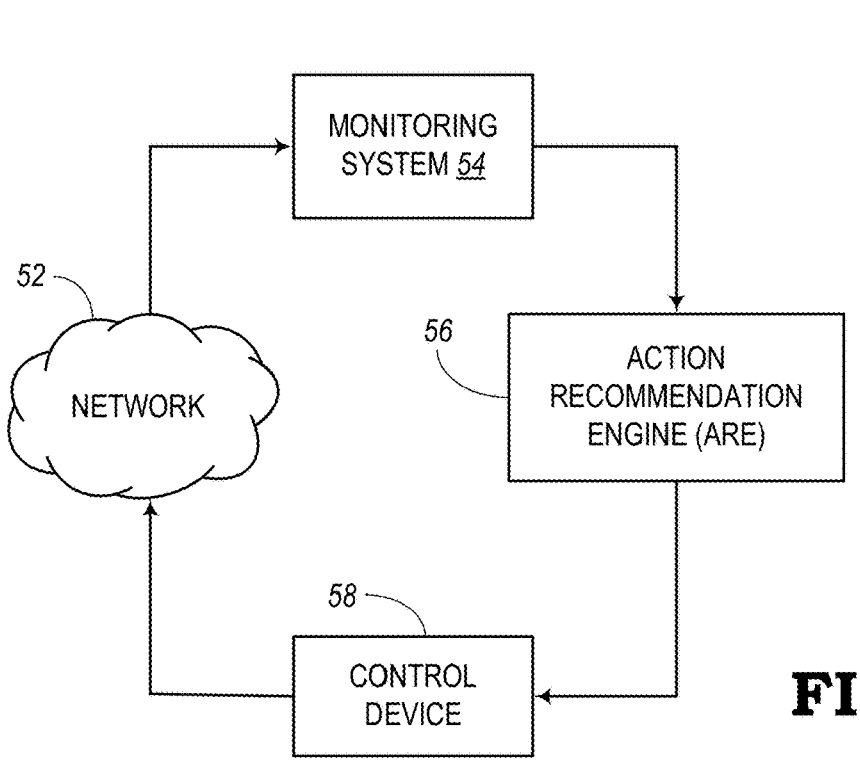
FIG. 3 is a block diagram illustrating a closed-loop system for providing adaptive control of a network, according to various embodiments.

FIG. 3 is a block diagram illustrating another embodiment of a closed-loop system 50 for providing adaptive control of a network 52. A monitoring system 54 may be used to obtain historical input data from the network 52. The input data may include metrics, parameters, characteristics, etc., measured or obtained in any suitable manner from network elements of the network 52. In addition to statistic-type data, the monitoring system 54 is also configured to obtain information about various actions that have taken place in the network 52. The data and information obtained by the monitoring system 54 is provided to an Action Recommendation Engine (ARE) 56, which includes AI-based processing to utilize the data/information for training a model. Once trained, the model of the ARE 56 may be utilized for providing control instructions to a control device 58. In this way, when newly obtained metric data and action information is provided to the ARE 56, the ARE 56 can utilize the AI model to instruct the control device 58 to perform certain functions. For example, the control device 58 may be configured to perform certain recommended actions on the network 52 or to simply provide a recommendation of actions that may be taken by a network operator responsible for enacting changes to the network 52.

More particularly, the monitoring system 54 may be configured to obtain input data (e.g., telemetry data) regarding measurements of various parameters or metrics of the network 52. In addition, the monitoring system 54 may be configured to detect historical actions that have been applied to the network 52.

According to some embodiments, the ARE 56 may be configured to perform various machine learning processes and may also assist to control processes for training and utilizing a ML model, as needed. The ARE 56 may be configured to train (and re-train, as needed) a ML model based on the historical data and actions imposed on the network 52. Once a ML model is trained, the ARE 56 may be configured to use the trained ML model to process new parameters obtained from the network 52 and new actions imposed on the network 52 to perform remediation actions, instructional actions, and/or detection actions.

The ARE 56 may be implemented with supervised ML. Equipped with input data from the monitoring system 54, the ARE 56 can be implemented as a (multi-class) classifier trained with a supervised ML approach. In this framework, the time-series of alarms and KPIs are the features characterizing the different possible states of network elements, while the actions are the labels that are to be learned. For example, labels may be "normal," "router issue," "congestion," "high traffic," etc.

The present disclosure therefore describes a closed-loop system 50 having an Action Recommendation Engine (ARE) 56 that is based on Machine Learning (ML) to support closed-loop applications for networks. Once input is received by the monitoring system 54, there may be two different approaches to implementing the ARE 56, where one approach may be based on supervised ML, and another approach may be based on Collaborative Filtering. The ARE 56 can then be used to provide some results that can improve the state of the network 52 or provide various benefits for solving or improving network issues, such as, among others: 1) recommending a closed-loop action, and 2) identifying one or more root-causes of network issues.

Again, the monitoring system 54 is configured to receive input data. To be used "live" (inference), the inputs to the ARE 56 are the same as some network assurance applications. The inputs may include alarms, Key Performance Indicators (KPIs) of the network elements, traffic and services flow information, Quality of Service (QoS) information, Quality of Experience (QoE) information, etc. However, for the training component 66 of the ARE 56 to train ML models, the ARE 56 relies on an input that is not normally utilized. In particular, the new input that is uses is information regarding a plurality of actions performed on the network 52. For instance, some of the actions may include:
DOC Action: Channel Add in Progress, MRS-R00, Shelf:1 Slot:1, 2020-03-24 21:49:52
DOC Action: Channel Delete in Progress, MRS-R00, Shelf:1 Slot:1, 2020-03-24 22:53:22
Software Auto-Upgrade in Progress—MOTR, WAT-R002, Shelf:5 Slot:13, 2020-03-24 23:49:52
Protection Switch Complete—Revertive—OTM0 Shelf:1 Slot:5 Port:6, 2020-03-25 08:25:58

The events, network operations, or other information regarding network actions can be collected from sources such as Network Management Systems (NMSs), ticketing systems, Network Configuration and Change Management (NCCM) systems, etc. One goal may be to collect as much data as comprehensively as possible in order to derive the best precision and recall from ML algorithms.
Network Operations Center (NOC)

Figure 4:
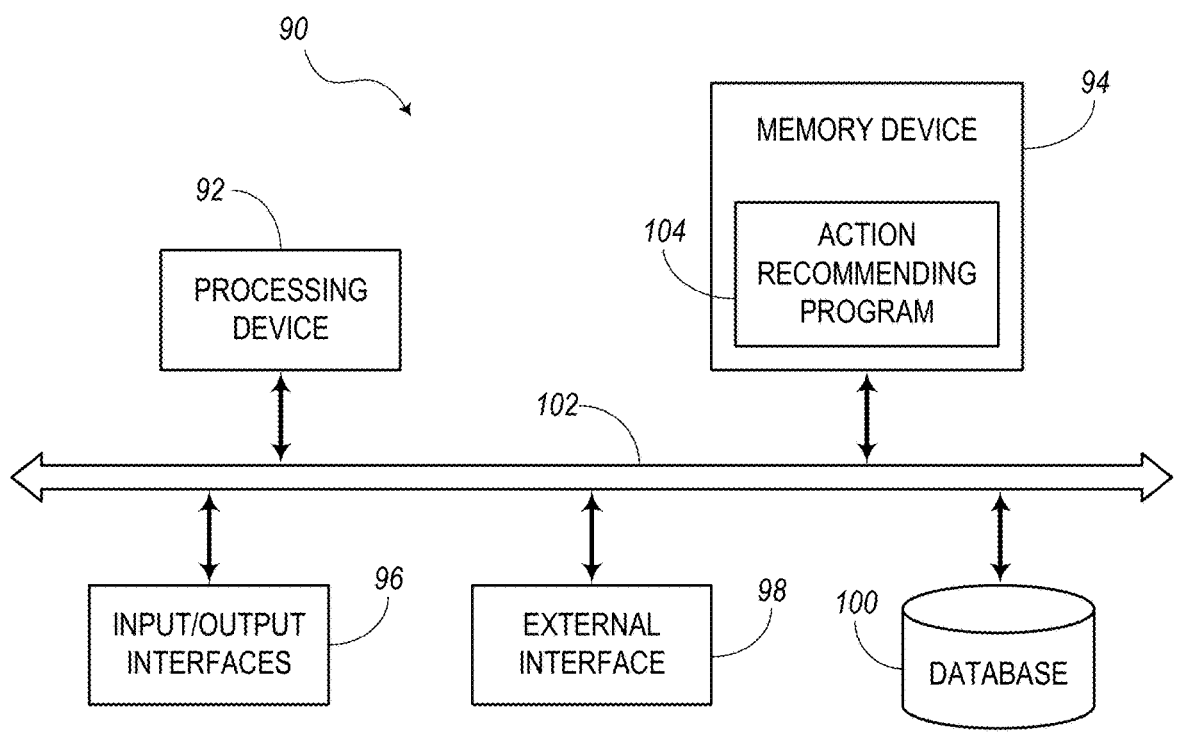
FIG. 4 is a block diagram illustrating a Network Operations Center (NOC) for providing closed-loop or feedback control to a network, according to various embodiments.
Figure 7:
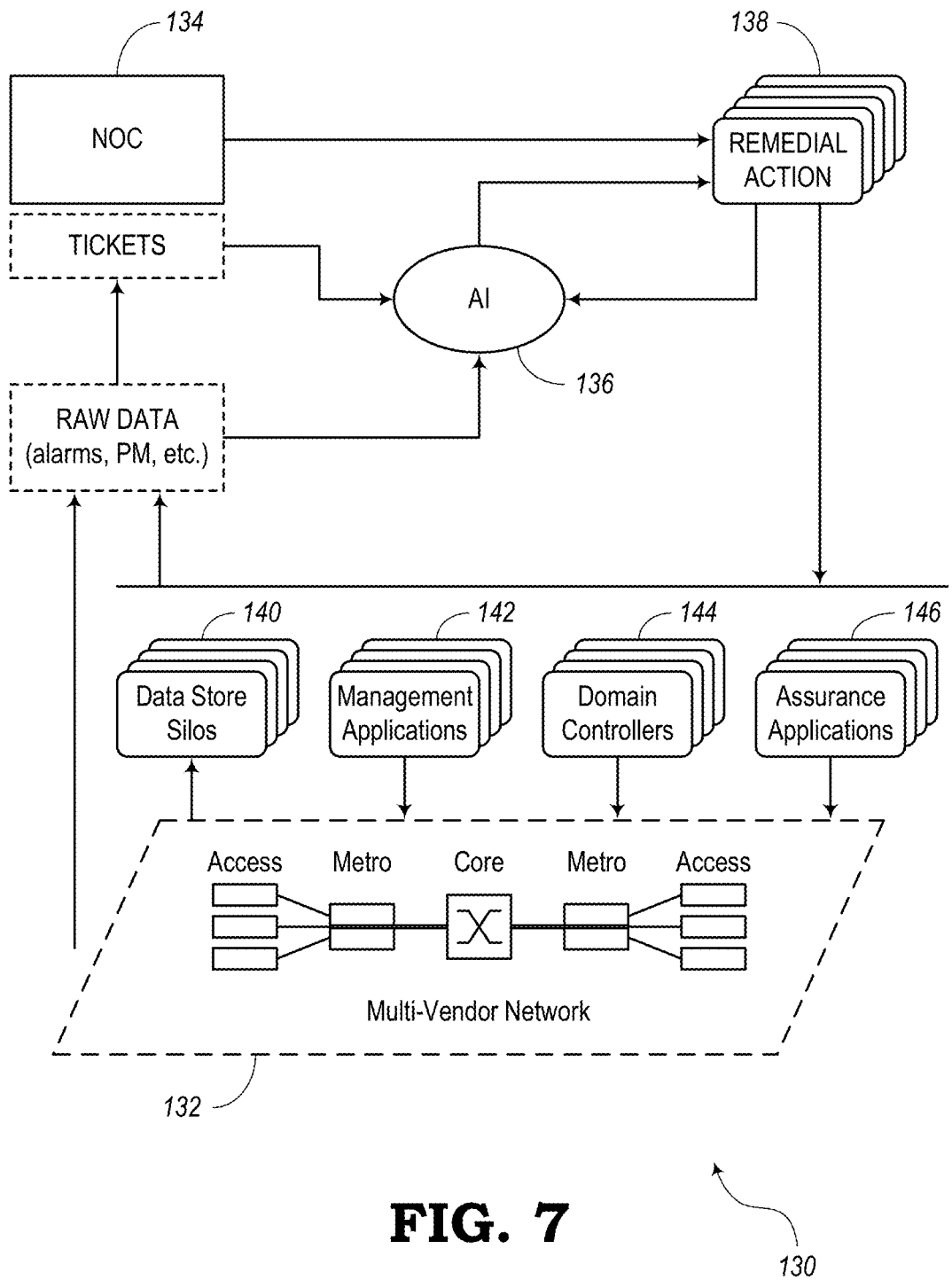
FIG. 7 is a diagram illustrating another ARE system, according to various embodiments.

FIG. 4 is a block diagram illustrating another embodiment of a Network Operations Center (NOC) 90 (e.g., Network Management System (NMS) or other suitable controller), which may be used for providing closed-loop or feedback control to a network, such as the environment 12, network 32, 52, or other executable system or environment. In the illustrated embodiment, the NOC 90 may be a digital computer that, in terms of hardware architecture, generally includes a processing device 92, a memory device 94, Input/Output (I/O) interfaces 96, an external interface 98, and a database 100. The memory device 94 may include a data store, database (e.g., database 100), or the like. It should be appreciated by those of ordinary skill in the art that FIG. 7 depicts the NOC 90 in a simplified manner, where practical embodiments may include additional components and suitably configured processing logic to support known or conventional operating features that are not described in detail herein. The components (i.e., 92, 94, 96, 98, 100) are communicatively coupled via a local interface 102. The local interface 102 may be, for example, but not limited to, one or more buses or other wired or wireless connections. The local interface 102 may have additional elements, which are omitted for simplicity, such as controllers, buffers, caches, drivers, repeaters, receivers, among other elements, to enable communications. Further, the local interface 102 may include address, control, and/or data connections to enable appropriate communications among the components 92, 94, 96, 98, 100.

The processing device 92 is a hardware device adapted for at least executing software instructions. The processing device 92 may be any custom made or commercially available processor, a Central Processing Unit (CPU), an auxiliary processor among several processors associated with the NOC 90, a semiconductor-based microprocessor (in the form of a microchip or chip set), or generally any device for executing software instructions. When the NOC 90 is in operation, the processing device 92 may be configured to execute software stored within the memory device 94, to communicate data to and from the memory device 94, and to generally control operations of the NOC 90 pursuant to the software instructions.

It will be appreciated that some embodiments of the processing device 92 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 92 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 96 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 96 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The external interface 98 may be used to enable the NOC 90 to communicate over a network, such as the network 32, 52, the Internet, a Wide Area Network (WAN), a Local Area Network (LAN), and the like. The external interface 98 may include, for example, an Ethernet card or adapter (e.g., 10 BaseT, Fast Ethernet, Gigabit Ethernet, 10 GbE) or a Wireless LAN (WLAN) card or adapter (e.g., 802.11a/b/g/n/ac). The external interface 98 may include address, control, and/or data connections to enable appropriate communications on the network 32, 52.

The memory device 94 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 94 may incorporate electronic, magnetic, optical, and/or other types of storage media. The memory device 94 may have a distributed architecture, where various components are situated remotely from one another, but can be accessed by the processing device 92. The software in memory device 94 may include one or more software programs, each of which may include an ordered listing of executable instructions for implementing logical functions. The software in the memory device 94 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 94 may include a data store used to store data. In one example, the data store may be located internal to the NOC 90 and may include, for example, an internal hard drive connected to the local interface 102 in the NOC 90. Additionally, in another embodiment, the data store may be located external to the NOC 90 and may include, for example, an external hard drive connected to the Input/Output (I/O) interfaces 96 (e.g., SCSI or USB connection). In a further embodiment, the data store may be connected to the NOC 90 through a network and may include, for example, a network attached file server.

Moreover, some embodiments may include a non-transitory computer-readable storage medium having computer readable code stored in the memory device 94 for programming the NOC 90 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 92 that, in response to such execution, cause the processing device 92 to perform a set of operations, steps, methods, processes, algorithms, functions, techniques, etc. as described herein for the various embodiments.

Therefore, according to various embodiments of the present disclosure, the NOC 90 may be configured in a closed-loop system. The NOC 90 comprises the processing device 92 and the memory device 94 configured to store a computer program having logic instructions (e.g., ML module) configured to cause the processing device to execute certain functions. For example, the logic instructions are configured to obtain input data pertaining to a state of a system (or environment 12, network 32, 52, etc.) in the closed-loop system and obtain information regarding one or more historical actions performed on the system. Furthermore, the logic instructions are configured to utilize a ML model for imposing one or more current actions on the system. For example, the one or more current actions may include: a) suggesting one or more remediation actions that, when performed, transition the system from a problematic state to a normal state, b) identifying one or more root causes in response to detecting a transition in the system from a normal state to a problematic state, and/or other actions.

Furthermore, the NOC 90 may be configured such that the logic instructions cause the processing device to train the ML model to recommend actions to be taken on the network. Training the ML model may use one or more processes selected from the group of processes consisting of: a) implementing a supervised ML technique, and b) implementing a collaborative filtering technique. In some embodiments, the supervised ML technique may include a classification process for classifying the state of the system and classifying the one or more historical actions performed on the system. The collaborative filtering technique may include the processes of: a) collecting action information regarding the one or more historical actions executed by a plurality of components of the system, b) comparing the action information associated with the plurality of components, and c) ranking and recommending the one or more remediation actions based on comparing the action information.

The input data may be time-series data captured from the network by one of a Network Management System (NMS) and a Network Configuration and Change Management (NCCM) device. The input data may include one or more of alarms, Key Performance Indicators (KPIs), network traffic information, service flow information, Quality of Service (QoS) information, and Quality of Experience (QoE) information. The one or more historical actions may include one or more of a channel addition process, a channel deletion process, a software upgrade, and a protection switch process. The procedure of suggesting one or more remediation actions may include one or more of: a) recommending a plan for re-routing network traffic through an alternative path in the network, b) recommending a change to a Quality of Service (QoS) policy on a port in the network to prioritize network traffic, and c) recommending migrating a payload closer to a source in the network.

Further regarding the NOC 90, the procedure of suggesting one or more remediation actions may include: a) determining a probability parameter associated with each of the one or more remediation actions, b) comparing each probability parameter with a predetermined threshold level, c) providing an output recommending that no action be imposed on the system in response to determining that the probability associated with each remediation action is below the predetermined threshold level, and d) responsive to determining that multiple probabilities exceed the predetermined threshold level, providing an output recommending a selected action of the one or more remediation actions be imposed on the system based on a predefined rule.

Similarly, the action of identifying the one or more root causes may include: a) determining a probability parameter associated with each of the one or more root causes, b) comparing each probability parameter with a predetermined threshold level, c) providing an output indicating that no root cause is likely in response to determining that the probability associated with each root cause is below the predetermined threshold level, and d) responsive to determining that multiple probabilities exceed the predetermined threshold level, providing an output that multiple root causes are likely based on a predefined rule.

Recommending Actions in the NOC

The memory device 94 may be configured to store an action recommending program 104 for determining actions to be taken in the network. The action recommending program 104 may be configured with computer logic, instructions, etc. for enabling the processing device 92 to perform one or more procedures related to recommending actions that may be taken. In some embodiments, the action recommending program 104 may be implemented in software and/or firmware. In other embodiments, the action recommending program 104 may be implemented as hardware elements associated with the processing device 92 for performing the action recommendation methods.

When executed, the action recommending program 104, according to some embodiments, may be configured to cause or enable the processing device 92 to perform the step of receiving raw, unprocessed data obtained directly from one or more network elements of a network. Also, the action recommending program 104 may enable the processing device 92 to perform the step of determining one or more remedial actions using a direct association between the raw, unprocessed data and the one or more remedial actions. These steps provide a generalized process that may be representative of various functionality of the action recommending program 104.

First Action-Recommendation Process

Figure 5:
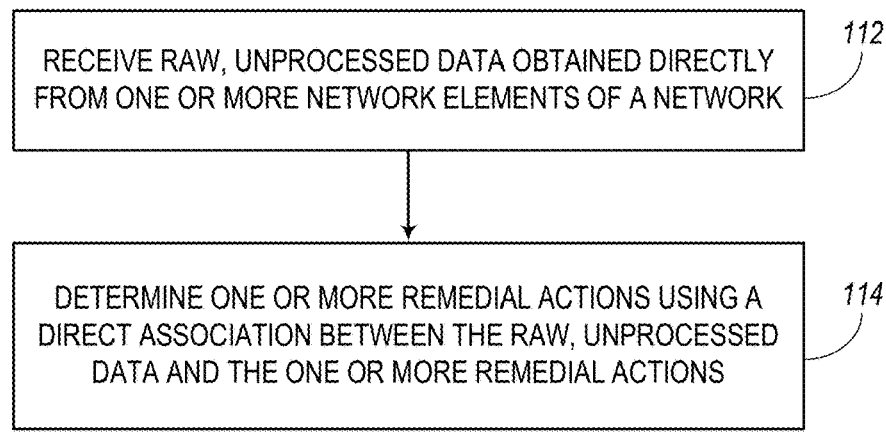
FIG. 5 is a general process of the NOC of FIG. 4, according to various embodiments.

FIG. 5 is a flow diagram illustrating a process 110 for executing action recommendations. For example, the process 110 may be associated with the action recommending program 104 and may be executed by the processing device 92 or other suitable devices. As shown in FIG. 5, the process 110 includes receiving raw, unprocessed data obtained directly from one or more network elements of a network, as indicated in block 112. The process 110 may also include determining one or more remedial actions using a direct association between the raw, unprocessed data and the one or more remedial actions, as indicated in block 114.

According to some embodiments, the process 110 may further be defined, whereby determining the one or more remedial actions is performed without determining a state of the one or more network elements. Determining the one or more remedial actions may include utilizing an ARE (e.g., ARE 56) by a control device (e.g., NOC 90). The process 110 may further include receiving a recommendation from the ARE regarding how, when, and where the one or more remedial actions are to be conducted on the network and leveraging the recommendation to enable manual execution of the one or more remedial actions in the network. Also, the process 110 may include utilizing the ARE to predict actions executed by a NOC based on the raw, unprocessed data.

Furthermore, the process 110 may include utilizing ML to reproduce actions of the NOC in communication with the network. The process 110 may also include obtaining the raw, unprocessed data from historical network data and historical action data from the NOC, pre-training a ML model, and allowing deployment of a Reinforcement Learning (RL) agent that initially uses zero RL exploration to represent NOC effectiveness and gradually, over time, allows RL exploration.

The process 110, in some embodiments, may also include utilizing RL to evaluate the effectiveness of the one or more remedial actions and learn new rules regarding remedial actions. For example, utilizing the RL may include determining a reward based on a difference between Quality of Experience (QoE) and operational expenses. According to various embodiments, the raw, unprocessed data may include Performance Monitoring (PM) data, margin information, alarms, Quality of Service (QoS) information, Quality of Experience (QoE) information, configuration information, fiber cut information, and/or fault information.

The one or more remedial actions may include: a) adjusting launch power at an amplifier, b) adjusting channel power at a Wavelength Selective Switch (WSS), c) adjusting a modulation scheme at an optical receiver, d) rebooting a card, e) cleaning or repairing a fiber, f) utilizing a protection path, g) adding bandwidth, h) defragmenting wavelengths across the network, i) running an Optical Time Domain Reflectometry (OTDR) trace, j) re-provisioning unprotected services after a loss of signal, k) adjusting Open Shortest Path First (OSPF) costs, l) re-routing Internet Protocol (IP) and Multi-Protocol Label Switching (MPLS) tunnels, m) modifying Border Gateway Protocol (BGP) routes, n) re-routing services based on utilization, o) auto-scaling Virtual Network Functions (VNFs), p) adjusting alarm thresholds, q) adjusting timer thresholds, r) clearing upstream alarms, s) fixing inventory, t) upgrading software, and/or any other various actions associated with the networks.

In some embodiments, the process 110 may also include collecting data related to the remedial actions conducted on the network. The data may be related to remedial actions being collected from one or more of shelf processor logs, command logs, a Network Management System (NMS) database, and Network Operations Center (NOC) tickets. The process 110 may also include learning a representation of a network state by observing hidden layers.

According to various embodiments, the network may be modeled in a simulated network environment. The process 110 may then be configured to utilize an RL technique to determine the one or more remedial actions of the simulated network environment and transfer the one or more remedial actions to an actual network. The process 110 can also include training RL agents with initial non-zero exploration in the simulated network environment and transferring pre-trained RL results from the simulated network environment to the actual network.

A high-level concept of AREs has been introduced in related U.S. patent application Ser. No. 16/892,594 (filed Jun. 4, 2020 and entitled "Action Recommendation Engine (ARE) of a closed-loop Machine Learning (ML) system for controlling a network") and is built around the concepts of network states, state transitions, and action classifiers, where Action classifier $C_A(S^x, S^y)=A^{xy}$, and where $A^{xy}$ is the recommended action to go from state "x" ($S^x$) to state "y" ($S^y$). Since determining the network state can be difficult or expensive and the state may not be well-defined, the related application is configured to assume that state information comes from external labeling for SL training and testing data sets. To address state problems, the present disclosure introduces a new version of ARE that can be trained solely from raw data and does not require a process that involves determining the network "state" explicitly. Also, the present disclosure is configured to add new data sources and new application use-cases.

On the other hand, related application U.S. patent application Ser. No. 16/185,471 (filed Nov. 9, 2018 and entitled "Reinforcement learning for autonomous telecommunications networks," as described above) is configured for closed-loop applications of Reinforcement Learning (RL) in more general terms. The present disclosure adds concrete data sources, training methods, reward function and application use-cases to this related application. Furthermore, the present disclosure is configured to provide offline RL that can be used to recommend actions in the absence of closed-loop automation.

Action Recommendation Engine (ARE) Systems

Figure 6:
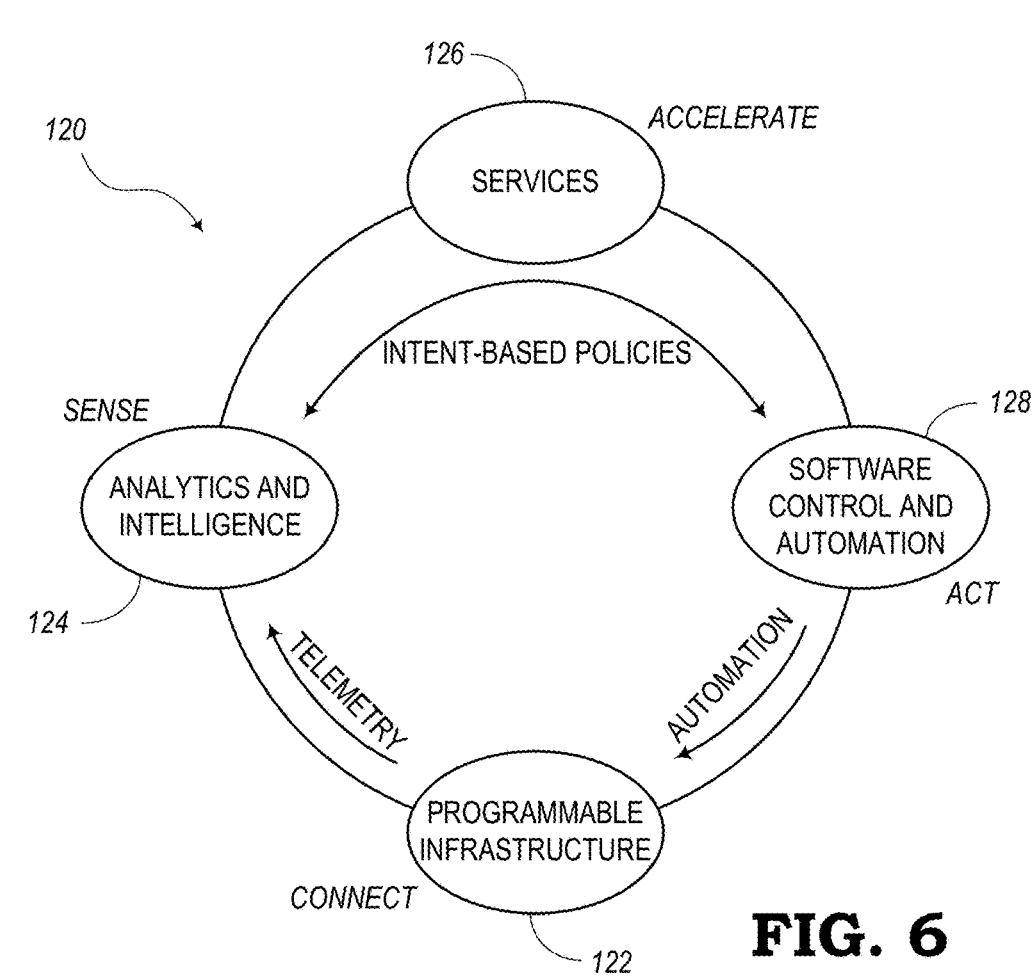
FIG. 6 is a diagram illustrating an Action Recommendation Engine (ARE) system, according to various embodiments.

FIG. 6 is a diagram illustrating an embodiment of an Action Recommendation Engine (ARE) system 120, which may be used to demonstrate the motivation behind the ARE processing in the present disclosure. In this embodiment, the ARE system 120 may be configured with or without closed-loop automation. While software (e.g., action recommending program 104) can act on programmable network infrastructure, the ARE system 120 is configured to provide guidance about where, when, and how to act. In some embodiments, the ARE system 120 may be AI-driven and can provide such guidance for complex situations where explicit "expert rules" are not optimal or not available.

In the embodiment of FIG. 6, the ARE system 120 includes a programmable infrastructure 122 (e.g., network) from which data can be obtained. A connection is made to analytics and intelligence 124, which receives data telemetry that is sensed from the programmable infrastructure 122. Services 126 may include intent-based policies. Software control and automation 128 may be configured with ARE processing logic for providing automation to the programmable infrastructure 122.

FIG. 7 is a diagram illustrating another embodiment of an ARE system 130. In this embodiment, a multi-vendor network 132 having access, metro, and core features is operating. Raw data (e.g., alarms, Performance Metrics (PM), etc.) is obtained from the multi-vendor network 132 and supplied as tickets to a Network Operations Center (NOC) 134. The tickets may also be supplied to an AI device 136. According to various embodiments, the NOC 134 may be configured as a Network Management System (NMS) or other system (e.g., at a data center or a remote facility) where an operator or network manager may be configured to make executive decisions about implementing changes to a network or other infrastructure. In some embodiments, decisions about network changes may be determined using AI processes or other machine-based analysis.

The NOC 134 and AI device 136 may be configured to perform various functions, such as identifying any problems that may exist in the multi-vendor network 132, which may be based on historic or newly acquired raw data and/or tickets. The NOC 134 and AI device 136 may also be configured to isolate various components (e.g., network elements) of the multi-vendor network 132 to diagnose these components. Based solely on the raw data, the NOC 134 and AI device 136 can determine remedial actions 138 to be executed on the multi-vendor network 132. As mentioned above, the process of determining remedial actions 138 can be performed in a unique manner whereby detection of the "state" of the multi-vendor network 132 is bypassed. Therefore, without determining the network state, the raw data can be utilized to directly determine the remedial actions 138.

A database (e.g., database 100) associated with the NOC 134 or AI device 136 may be used for storing the remedial actions 138. Also, the multi-vendor network 132 may be configured to store data in data store silos 140. Management applications 142, domain controllers 144, and assurance applications 146 may be stored in suitable memory and may be applied to the multi-vendor network 132 for management and control and for executing the remedial actions 138 on the multi-vendor network 132.

The arrangement of the ARE system 130 is configured to help the NOC 134 with faster and more effective network assurance. This may be done, for example, by only showing actionable alarms. Also, the ARE system 130 can help the NOC 134 to recommend actions (e.g., remedial actions 138). According to various implementations, the recommended actions may be saved and executed at a later time or may be executed immediately, depending on different circumstances of the multi-vendor network 132.

The ARE system 130 can be trained to recommend a broad set of actions across many different network domains and technologies. For example, actions may be recommended for (1) a network (e.g., optical network). Actions may be recommended for (2) one or more optical channels. Actions may be recommended for (3) an Internet Protocol (IP) network. Actions may be recommended for (4) services or other virtual resources. Actions may even be recommended for (5) network management (e.g., NOC 134). Action can also be recommended for other domains or technologies.

More particularly, recommended actions for (1) an optical network may include: a) rebooting a card (warm or cold), b) cleaning or repairing a fiber, c) protecting a path, d) adding bandwidth, e) defragmenting wavelengths across network, f) putting port in/out of service and running Optical Time-Domain Reflectometry (OTDR) traces, g) re-provisioning un-protected services after a LOS, among others.

Recommended actions for (2) an optical channel may include: a) adjusting launch power at one or more amplifiers, b) adjusting channel power at a WSS, c) adjusting a modulation scheme at an optical receiver, among others.

Recommended actions for (3) IP network may include: a) adjusting Open Shortest Path First (OSPF) costs, b) re-routing Internet Protocol (IP) and Multi-Protocol Label Switching (MPLS) tunnels, c) modifying Border Gateway Protocol (BGP) routes, among others.

Recommended actions for (4) services and other virtual resources may include: a) re-routing services based on utilization, b) auto-scaling Virtual Network Functions (VNFs), among others.

Recommended actions for (5) network management (e.g., NOC, NMS, etc.) may include: a) adjusting alarm thresholds, b) adjusting timer thresholds, c) clearing upstream alarms, d) fixing inventory, e) upgrading software, among others.

Raw Unprocessed Input Data

Raw data can be obtained from any suitable measuring device in communication with the network of interest. Raw data may be defined as parameters or metrics obtained directly without any processing involved. One of the goals of the ARE is to recommend appropriate remedial actions in reaction to problematic situations (or "context"). In the environment of ML, detection is made of the conditions of the network and/or actions taken to adjust or change the network or network elements. The captured data may include an indication of concrete field data that can be used for training and testing ARE.

Referring again to FIG. 7, the NOC 134 and/or AI device 136 of the ARE system 130 are configured to learn how to associate incoming raw data (e.g., "context data") with remedial actions 138 to correct any problematic conditions of the multi-vendor network 132. The context data may include alarms, PM data, etc., which may be related to device performance, Quality of Service (QoS), Quality of Experience (QoE), or other metrics. The "action" data can be collected from one or more of shelf processor logs (e.g., in an optical line system), command logs (multi-vendor), an NMS database, NOC tickets, etc. Action data may be collected by custom software. Normally, conventional systems do not access this data from shelf processor logs and command logs. Therefore, using these sources of action data for an ARE system is considered to be new in the field. Collecting such action data can be done automatically in the field with resource adapting software products that connect to each network element (NE), execute a Retrieve Log process on each NE, and parse each log file.

Simulation

Figure 8:
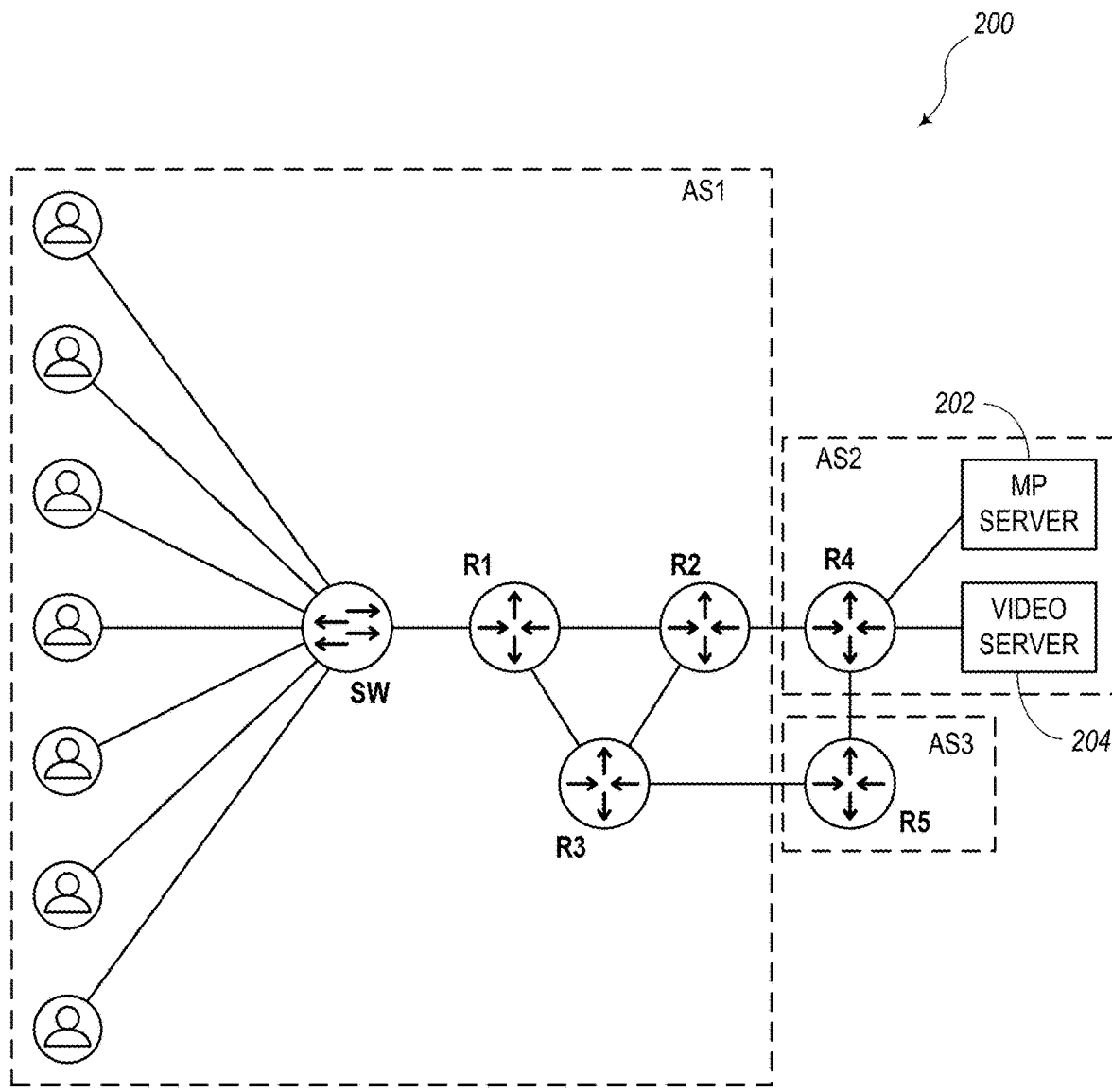
FIG. 8 is a diagram illustrating a prototype of a simulation network, according to various embodiments.

FIG. 8 is a diagram illustrating an embodiment of a prototype of a simulation network 200 includes a first Autonomous System (AS1), a second Autonomous System (AS2), and a third Autonomous System (AS3). The AS1 includes routers R1, R2, and R3 and a switch SW connected to a plurality of end user devices. The AS2 includes an MP server 202, a video server 204, and a router R4. The AS3 includes another router R5. In this embodiment, four paths are considered for providing content from the servers 202, 204 of the AS2 to the end users via SW. Particularly, various paths may be routed from R4 to R1. A first path (Path 1) proceeds from R4 to R2 to R1. A second path (Path 2) proceeds from R4 to R2 to R3 to R1. A third path (Path 3) proceeds from R4 to R5 to R3 to R1. A fourth path (Path 4) proceeds from R4 to R5 to R3 to R2 to R1.

To demonstrate the feasibility of action recommendation processes, the simulation network 200 can be developed as a prototype. In this embodiment, the simulation network 200 was designed to be simple but not trivial. It includes five IP routers R1-R5, three (or four) IP/MPLS tunnels connecting a varying number of clients (end users) in AS1 to the MP server 202, the video server 204, and/or other servers (e.g., FTP servers) in AS2. Using custom software, the number of clients or end users can change over time, which can create traffic on the network and occasionally create congestion. Another aspect of the simulation network 200 is that issues of routers R1-R5 can be randomly introduced.

To mimic NOC actions, the simulation network 200 can be configured to implement five "expert rules," which may be based on common sense and may include:
1. if congestion, re-route internally if possible;
2. else-if congestion, re-route externally (AS3);
3. else-if router issue, fix router (e.g., reboot);
4. else-if traffic on Path 3 (R4-R5-R3-R1), re-route internally if non-congested; and
5. else do nothing.

Consequently, twelve actions were possible in the simulation network 200, including, for example, re-routing flows among three (or four) paths, rebooting AS1 routers, waiting (e.g., do nothing). Then, the simulation network 200, including NOC and end-users, can run by itself for long periods of time, collecting PM data periodically (e.g., every 30 seconds) and giving an opportunity to take an action periodically (e.g., every minute). In this way, context data and action data can be generated. As described below, the simulation network 200 can be leveraged to prove three different ML methods. With all three methods, it is shown that ARE can be trained solely from raw context and action data.

Method 1: Stateless Supervised ML

Supervised Machine Learning (SL) can be used to reproduce the NOC action logic. In related U.S. patent application Ser. No. 16/892,594 (mentioned above), NOC action can be reproduced using a two-step process: 1) determining the network "state" from context data, and 2) determining the recommended action from network "state." The present disclosure is able to demonstrate that the same thing can be done in one step, going straight from context data to a recommended action. For example, this may be done with deep learning algorithms where a representation of the network state is learned by hidden layers.

ARE with Reinforcement Learning

It should be possible to outperform NOC rules by using Reinforcement Learning (RL) algorithms in ARE. Indeed, SL may be configured to simply copy NOC actions, but RL also evaluates their effectiveness and can even discover new rules. Instead of labeling the context data, as before, it may be possible to capture the NOC end goals in an appropriate "reward" function that ARE will learn to maximize.

In this case, it is possible to use QoE—OPEX as the "reward," which may be an effective metric for capturing the end goals of the NOC actions. That being said, for telecommunications applications, it should be noted that the network should normally remain up and running at all times. However, this can be problematic with naïve RL by trial and error. As discussed below, two RL methods can be used by ARE with no risk of crashing the network.

Method 2: RL with Pre-Training from NOC Followed by Prudent Exploration

Method 2 may be generally defined as follows:
1. Batch RL: pre-train with historical data from the target network;
2. Deploy RL agent (e.g., ARE) with exploitation and no (zero) exploration, and confirm its behavior in production environment; and
3. Prudently allow small RL exploration, to learn new, better action policies The ML process in this case may exploit the concept of offline RL (aka "batch" RL). This may include a process of traversing a historical time-series where the context and action data is already pre-collected, computing the reward after each historical action, and updating the learning algorithm accordingly. Hence, offline RL can learn about the effectiveness of actions even if the decision to take these actions was not taken by an RL agent.

With this second method, RL training may include the following three steps. The first step (Step 1) may include pre-training with historical data from the target network. The historical action data may come from NOC decisions in this case. The second step (Step 2) may include deploying an RL agent (e.g., an ARE device) with only exploitation (and no exploration) and confirming its behavior in a production environment. In this case, it is expected that the NOC effectiveness can be reproduced. The third step (Step 3) includes "prudently" allowing a small amount RL exploration in order to learn new and better action policies. It is expected that this step will eventually outperform NOC effectiveness.

After Step 1, it has been noted that ARE recommendations can be leveraged for manual actions, although it is not mandatory to deploy ARE in a live environment. After Step 2, it has been noted that pure offline RL with zero exploration is effectively similar to supervised ML, though it is implemented differently.

Method 3: RL with Simulator and Transferring Learning to Real Network

Method 3 may be generally defined as follows:
1. Train RL agent with some (non-zero) exploration from the beginning in a simulated environment; and
2. Transfer pre-trained RL from simulator environment to a real network, validate that the ARE performance is as expected, then using the RL model in production.

Alternative to Method 2, the present disclosure may utilize another method to train RL with a network simulator. Then, the learned results obtained from the simulation can be transferred to a real network. After the first step of training the RL agents, it was noted that ARE recommendations can be leveraged for manual actions, although it is not mandatory to deploy ARE in a live environment.

Compared to Method 2, Method 3 may include one or more advantages since simulated data can be produced in virtually unlimited amounts, while historical data from real networks has a finite amount and can be expensive to collect. However, Method 2 may include one or more advantages since Method 3 relies on a good simulator, which may be difficult to develop, and since Method 3 is configured to transfer results from a simulator to real network and thus may be sensitive to simulation defects. Also, the learning associated with Method 2 may occur from the real network natively.

Extending Local-Level RL Agents for Use in a Larger Network

ARE methods described above enable actions to be automated using supervised and/or RL for a specific network topology with a relatively small number of observations and actions. In some cases, traditional distributed RL can be used to train individual agents on small, specific subsets of a larger network. Nevertheless, there is a need to enable the automated action recommendation calculations to be applied to a larger network and to properly scale to more realistic network topologies, which may include hundreds or thousands of nodes or NEs. Traditional models developed for small networks are not necessarily applicable and/or may not scale or be reused on networks of other larger topologies, or when the topology of the network changes.

In a traditional distributed RL, if each agent is trained independently, it cannot normally learn from other parts of the network directly, even if they share similar observation and action spaces. Also, traditional RL techniques may normally require a prohibitively large amount of data about a subnetwork before it can act effectively. If there are many subnetworks being trained in a traditional RL environment, training each subnetwork individually may become computationally expensive. If each RL agent is dependent on the relevant topology, it can be difficult to decide how to break up the larger network into regions of different topologies. Thus, in the conventional systems, the action of breaking up the network would normally require careful design of the training scenario for each agent. Therefore, the present disclosure is configured to overcome these shortcomings and allow more efficient calculation of a global or network-wide RL model.

It should be noted that the present application is directed to AI, ML, and RL systems and methods, which may include features that are the same as or similar to features described in commonly-assigned U.S. patent application Ser. Nos. 16/185,471 and [Ciena Request No. 10.2846] described above. In particular, RL may be used in autonomous communications networks and may utilize AREs for closed-loop control. A network engineer may use various RL models incorporated in an ARE associated with a NOC. The ARE may provide recommendations of various actions that the network engineer may take to improve the operations of the network.

The ARE is a tool that can be used to predict the correct action that a Network Operations Center (NOC) engineer should take when presented with some issue or undesirable state on the network. In general, the ARE relies on ML to learn the correct actions based on a network state defined by a set of Key Performance Indicators (KPIs). Some embodiments include ML methods that perform these functions while avoiding training procedures that learn from scratch in a live production network. This training can therefore be performed either through Supervised Learning (SL) or Reinforcement Learning (RL).

In some embodiments, the systems and methods of the present disclosure may be configured to improve upon the Methods 2 and 3 described above. For example, Methods 2 and 3 may be limited in the sense that the generated model might only be applicable within a specific topology. However, if this topology were to change or if the model were to be used to make recommendations on another network, the model would normally need to be retrained from scratch.

Another limitation of Methods 2 and 3 is that, in some cases, the generated RL model may only be useful for a test network that is relatively small (e.g., having a small number of IP routers and IP/MLPS tunnels connecting a clients to a server. Therefore, the following embodiments may be extended to be applicable on a larger scale, such as a network having hundred or thousands of nodes (e.g., NEs, routers, etc.) and links. In a large or network or test environment, the feature and action space may normally become so large that training a single RL model would become computationally prohibitive. The embodiments of the present disclosure are configured to overcome this hurdle. Indeed, even if the network topology changes, instead of retraining the entire model as in previous attempts, the embodiments of the present disclosure are configured to simple make modifications without complete retraining. Thus, the present embodiments extend the RL techniques to allow them to scale to networks of any size and configuration.

According to one potential solution to the scaling problem, it has been contemplated to train multiple, decentralized RL agents from scratch on subsets of the network (referred to herein as "subnetworks"). However, this approach includes some disadvantages. First, if each agent is trained independently, it cannot learn from other parts of the network directly, even if they share similar observation and action spaces. Thus, each agent may require a large amount of data about its own subnetwork before it can act effectively. Second, if there are many subnetworks, training each one individually may become computationally expensive. Third, if each RL agent is not topology-agnostic (i.e., each RL agent is dependent on topology information), then it can be difficult to decide how to break the larger network into regions of different topologies, requiring careful design of the training scenario for each agent.

Network Prototype

Figure 9:
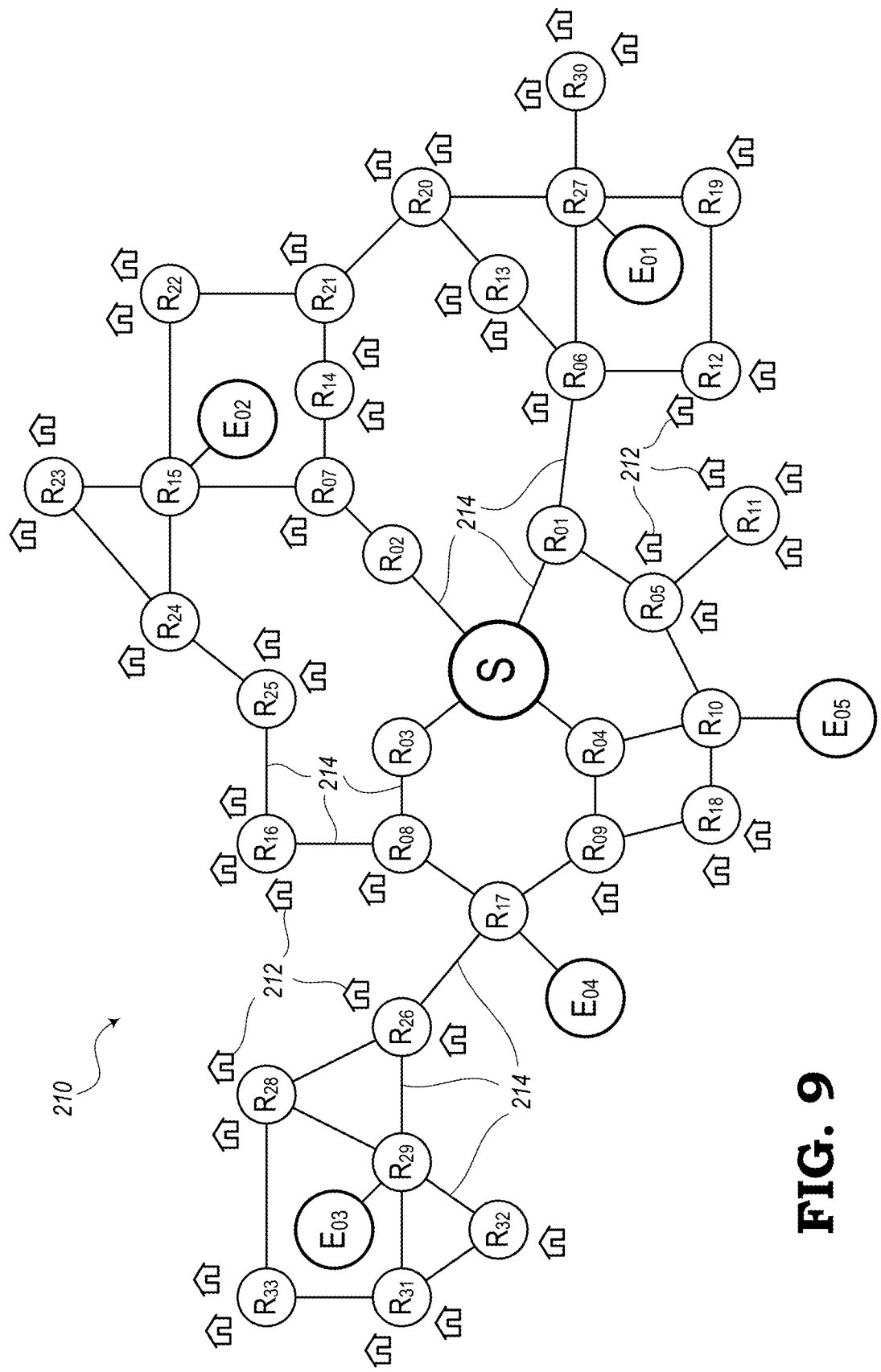
FIG. 9 is a diagram illustrating an example of a network for demonstrating a procedure in which one or more RL agents are calculated on a local level for one or more subnetworks and then applied on a global level to the entire network, according to various embodiments.

FIG. 9 illustrates an example prototype of a network 210. The network 210 in this example may still represent a relatively small network compared with real-world networks, it is used to demonstrate a procedure in which one or more RL agents can be calculated on a local level for one or more subnetworks. Then, the local RL agents can be applied on a global level to the entire network based on tunnel-related similarities.

As illustrated, the network 210 includes a server (S), which may be configured as a data center, cloud-based data center, edge server, etc. for providing some type of service (e.g., video services) to customers 212 (or clients) connected to the network 210. The network 210 also includes five edge servers $E_{01}$, $E_{02}$, $E_{03}$, $E_{04}$, $E_{05}$ in this example. The edge servers E may assist the server S with providing services to the customers 212. Furthermore, in this example, the network 210 includes thirty-three routers (e.g., nodes, NEs, etc.), labeled $R_{01}$ through $R_{33}$. The server S, edge servers E, and routers R are connected to each other via a number of communication links 214. In this way, the customers 212 can download or stream video (or receive other network services) from the server S and/or edge servers E.

The five edge servers E are capable of serving a limited number of clients (e.g., customers 212). It may be cheaper to use edge servers since they are typically closer to the clients. However, it is not possible to serve all clients in the neighborhood due to their limited capacity. A data center (e.g., cloud, server S, etc.) may be depicted as a video server that essentially has unlimited capacity. It serves as a default video source when local edge servers E get overloaded. However, since the data center is far away from many clients, streaming videos from this server S should be minimized to avoid causing network congestion. Also, a large number of clients may be connected to the network at random points in time via the routers R. A client can stream videos at random bitrates (e.g., defined by their adaptation algorithm). A BOLA algorithm may be used for this purpose.

Of the thirty-three routers R shown in FIG. 9, twenty-four of them act as gateways to video clients. For each router R, a tunnel group is created, and an RL agent is assigned to control this tunnel group. Each tunnel group may include two main tunnels, where one connects the router to the nearest edge server E, and the other connects the router to the data center (e.g., server S) through the shortest path. Each one of these two main tunnels may also include one or more backup tunnels in some arrangements. The backup tunnels may be calculated such that the overlap with its corresponding main tunnel may include less than 50%. In other words, less than half of the routers R used for the main tunnels may be used for the backup tunnels.

Also, it may be noted that the edge servers E may be related to specific neighborhoods. However, since the embodiments of the present disclosure are directed to techniques that are independent of network topology, the detection of various tunnels (e.g., paths, routes, etc.) is not limited to neighborhoods or other topology related restrictions. In the present disclosure, multiple tunnels may be calculated for connecting each customer 212 with one or more servers S, E. The tunnels are calculated through one or more intermediate routers R via the relevant communication links 214. For example, with respect to customers 212 connected to router $R_{13}$, it may be noted that these customers 212 may access the edge server $E_{01}$ via a first tunnel including routers $R_{13}$, $R_{06}$, $R_{27}$, a second tunnel including routers $R_{13}$, $R_{20}$, $R_{27}$, or a third tunnel including $R_{13}$, $R_{06}$, $R_{12}$, $R_{19}$, $R_{27}$. Also, these customers 212 may also access the server S via a fourth tunnel including routers $R_{13}$, $R_{06}$, $R_{01}$ or a fifth tunnel including routers $R_{13}$, $R_{20}$, $R_{21}$, $R_{14}$, $R_{07}$, $R_{02}$. Although other longer tunnels may exist, some embodiments of the present disclosure may limit each tunnel to a certain number of hops. A "tunnel group," as defined herein, includes a list of applicable tunnels (e.g., the first through fifth tunnels described in this example) for the particular group of customers 212. Also, this tunnel group may also be associated with a "subnetwork," which includes a group of routers R that are used for detecting the various tunnels for connecting this particular customer 212 to one or more of the edge servers E and/or server S.

The topology of the network 210 in this example may represent a realistic building block for larger networks. Methods may be used for scaling up the network to include multiple servers, routers, and a large number of customers or clients. The setup in this example may be implemented using a discrete event simulator and serves as a testbed to evaluate the robustness and scalability of the ML models of the present disclosure.

In essence, the graph generation problem translates the search problem of finding a graph or set of graphs conforming to a set of potentially interdependent properties within the search space of all potential graphs. Essentially, a graph generator algorithm or technique (e.g., associated with the NOC 90 of FIG. 4) may be configured to generate graphs that closely resemble the characteristics of real-world ISP networks rather than simply generating random graphs.

There may be different approaches to synthetically generating graphs with certain properties. One approach is to use evolutionary algorithms to gradually add more nodes and edges to the network, simulating a natural growth in the number of devices and connections. This approach allows for a gradual increase in complexity and allows to study how the ML algorithm adapts to the changes. An evolutionary computation graph algorithm typically follows the following steps to generate a large graph from a small one:

1. Initialization: The algorithm starts by creating an initial population of small graphs, usually generated randomly or by using an existing graph as a starting point.
2. Selection: The algorithm then selects a subset of the current population of graphs that will be used to create the next generation of graphs. Selection is typically done using a fitness function that assigns a score to each graph based on how well it conforms to the set of desired properties.
3. Crossover: The selected graphs are then combined to form new graphs through a process known as crossover. Crossover typically involves randomly selecting edges or nodes from each parent graph to form the new graph.
4. Mutation: The new graphs are then subject to random mutations, which involve small changes to their structure such as adding or removing edges or nodes.
5. Evaluation: The new generation of graphs is then evaluated using the fitness function and the process is repeated until a graph that meets the desired properties is found or a certain stopping criterion is reached.

Since evolutionary algorithms are stochastic, an important point of concern is the time it takes to converge to a set of acceptable graphs. For example, if the graph is represented in terms of connectivity matrix, it is possible to achieve fine-grain control over the generated topology at the expense of slow convergence speed. On the other hand, if a more efficient representation is used such as defining the generating function, the convergence speed improves but the fine-grain control become limited.

Another approach is to use generative models, where an algorithm is given a specific graph and is asked to generate variations of the graph that preserves certain properties such as graph density. Traditional approaches to graph generation focus on various families of random graph models, which typically formalize a simple stochastic generation process.

However, due to their simplicity and hand-crafted nature, these random graph models generally have limited capacity to model complex dependencies and are only capable of modeling a few statistical properties of graphs.

More recently, building graph generative models using neural networks has attracted increasing attention. Compared to traditional random graph models, these deep generative models have greater capacity to learn structural information from data and can model graphs with complicated topology and constrained structural properties. There are generally two approaches to generating synthetic graph based on the type of NN architecture used.

The first approach uses an encoder-decoder architectures (such as variational auto-encoders), the encoder network extract useful features about the reference graph, and the decoder network is used to construct a new similar graph in one shot by defining the individual entries in the graph adjacency matrix (i.e., edges). This approach makes the models efficient and generally parallelizable but can seriously compromise the quality of the generated graphs.

The second approach use recurrent networks to model the graph generation as a sequential process. In this approach, the NN starts with a small network and sequentially add nodes and edges, or small graph structures to grow the network to the desired size. One advantage of this approach is the ability to accommodate for complex dependencies between generated edges.

While generative models based on deep NN may be powerful tools for generating synthetic graphs, it may be decided to use a more traditional approach because the process of training these NN models can be expensive and can require constructing large dataset of network topologies.

A third approach may be implemented for generating large graphs, where a set of small sub-networks act as building blocks. By randomly sampling these sub-networks and connecting them together, a large network can be constructed with specific properties such as degree distribution or clustering coefficient. This approach allows for greater control over the properties of the small sub-networks, and thus the generated large network.

One reason to use this approach may be based on access to a real ISP network topology. The techniques may involve studying the structure of networks and creating synthetic graphs that closely resemble the characteristics of the networks. As an example, FIG. 9 illustrates a candidate network simulated using a discrete event simulator.

Potential Subnetworks

Figure 10:
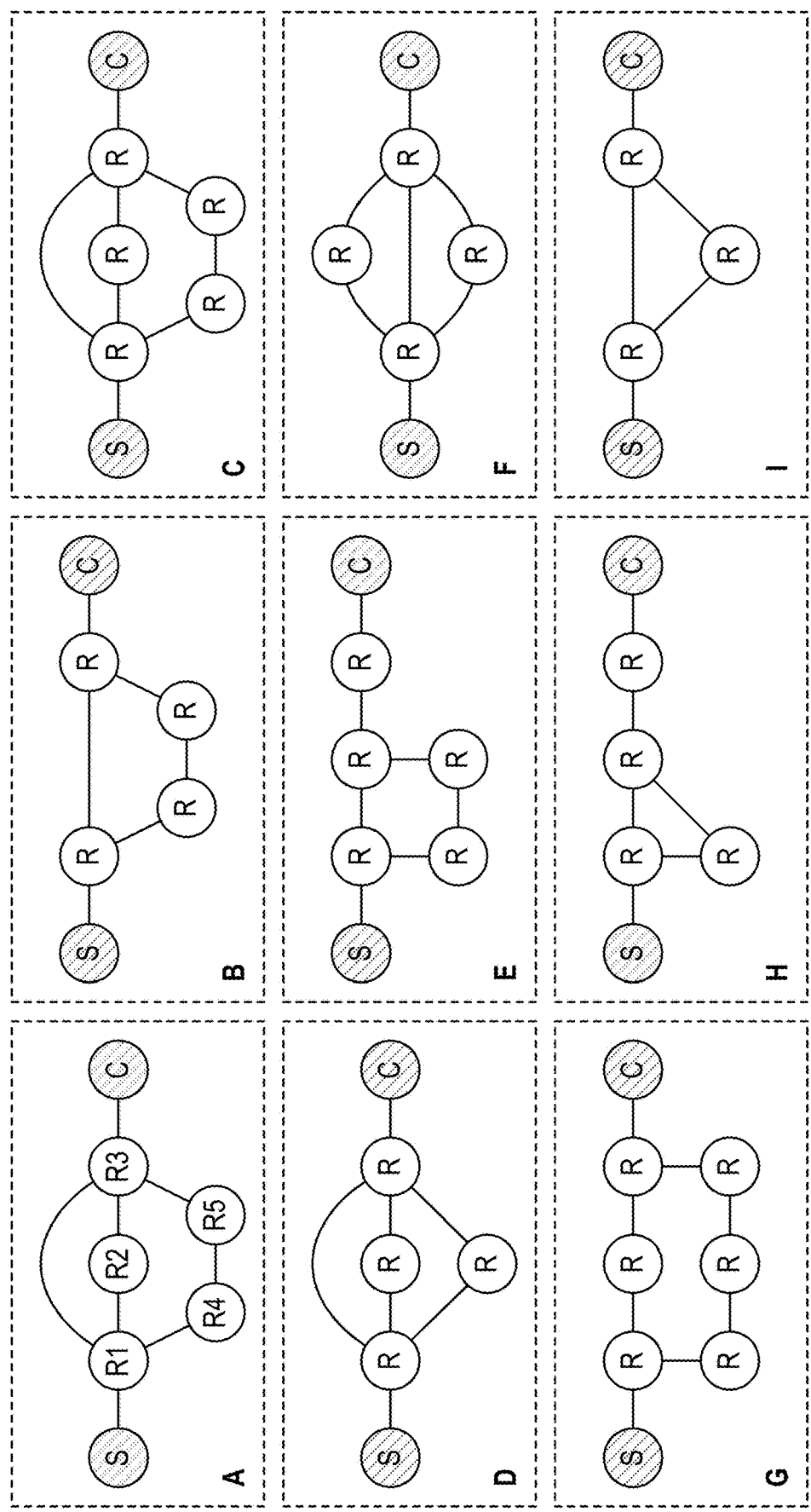
FIG. 10 is a diagram illustrating an example of various potential subnetworks, which may be extracted from the network of FIG. 9 and which may be analyzed independently for calculating local-level RL agents, according to various embodiments.

FIG. 10 is a chart 220 illustrating examples of various potential subnetworks, labeled A-I, which can be extracted from a network (e.g., network 210). It should be noted that the nine subnetworks A-I in this example do not necessarily represent subnetworks that can be found in (or split from) the network 210 of FIG. 9 and do not necessarily represent all possible subnetworks that can be found in any network. Instead, this chart 220 simply represents some examples for demonstrating various arrangements in which multiple tunnels may be available from one end of the subnetwork to the other. Each of the subnetworks A-I includes a server S at one end connected to a customer C (or client) at the other end via a specific arrangement of routers R. The chart 220 shows an inexhaustive set of examples of subnetworks that can be extracted from the network 210. Despite a large diversity of topologies, the calculation of a global RL model for the whole network 210 can be used to normalize the observations into a topology-agnostic framework to facilitate training a single RL agent over many subnetworks simultaneously.

Based on the arrangement of routers R and communication links between the server S and customer C, different tunnels may be created. With respect to the subnetwork A, routers R are labeled R1, R2, R3, R4, and R5. According to the specific arrangement of subnetwork A, tunnels from the server S to the customer C include a first tunnel R1-R3, a second tunnel R1-R2-R3, and a third tunnel R1-R4-R5. Once the tunnels are detected, the specific subnetwork may be analyzed independently, based on the topology of the subnetwork, for calculating local-level RL agents that are applicable to that subnetwork. Then, at a later stage, this local-level RL agent may be applied to other portions of a network having the same or similar topology.

It may be noted that one tunnel may be designated as a main (primary) tunnel and one or more tunnels may be designated as backup tunnels. The backup tunnels may be calculated using the "less than 50% overlap" rule to ensure the robustness of the network 210. If a communication link 214 is shared among many different tunnels, its removal or unavailability could cause a significant degradation in connectivity. Therefore, when designing the network 210, one strategy may include ensuring that most of the nodes are connected by a set of paths with none or very few nodes in common, thereby boosting the robustness of the whole network 210 and allowing the design of expert-rules that protect, maintain, and recover the network 210 from any failure.

Another consideration in designing or simulating the network 210 is that a portion of the network routers R do no act as gateways and have no customers 212 or clients connected to them. This may be considered in order to reflect the multi-layer hierarchy in the design of an ISP network where some routers (in the core and aggregation layers) do not have clients associated with them. The clients are typically served by routers in the access layer of the hierarchy.

The method may also be able to (virtually) break the network 210 into smaller tunnel groups that are topology-agnostic. This approach can ensure that no agent is responsible for more than its tunnel group. As a result, the algorithm may be scalable to arbitrary network sizes. Also, since these tunnel groups may represent basic network portions used during training (e.g., except for the number of hops which can be fed as part of the input data), the local-level ML agents can also be expected to perform well on different larger networks.

The NOC 90 may be configured to utilize the action recommending program 104 to train a global RL model for the whole network, test the global RL model, make modifications to the global RL model as needed, and then utilize the global RL model in a real-world environment during inference or production. The network 210, according to the prototype shown in FIG. 9, has been developed such that it can determine action recommendations and/or automate NOC actions to reroute traffic amongst the various tunnels in the network 210. The training environment (e.g., network 210) may be modeled as a Decoupled Partially-Observable Markov Decision Process (Dec-POMDP), which means that interactions may be carried by multiple independent RL agents.

A true state of a given subnetwork may be defined by a) the condition of each communication link 214 (e.g., normal, congested, broken, etc.), b) the condition of each client or service to that client (e.g., QoE, ABR algorithm, CPU utilization, etc.), and c) actions taken by other RL agents, which can indirectly affect the state/reward received by the RL agents. However, the RL agents may be "topology-agnostic," or independent of the topology, and thereby may not be influenced by certain observations reflective of the true state. Instead, the RL agent may receive as input topology-agnostic information, which be aggregated data that includes a) end-to-end QoS metrics (e.g., delay, jitter, packet loss, etc.), b) end-to-end QoE metrics (e.g., bitrate, buffer level, startup delay, etc.), and/or aggregated network parameters (e.g., number of hops per tunnel, clients per tunnel, etc.). These observations, metrics, or inputs may be easily available to both ISPs and Over-the-Top (OTT) providers.

In the embodiments with respect to expanding local RL agents to a global application for an entire network, the RL reward (e.g., reward function 36) described above may also be used. In some cases, the RL reward may be QoE minus operating expense (OPEX). For the action space, the global RL model may be able to switch a client from one tunnel to any of the other tunnels. In some embodiments, the step of fixing a specific number of hops may be omitted, since the topology-agnostic RL agent may be configured to distinguish between tunnels but may not distinguish the individual hops.

Therefore, the systems, methods, and non-transitory computer-readable media of the present disclosure may include various embodiments for expanding small scale localized subnetwork RL training for use on a global scale for an entire network. In one implementation, the processing device 92 may be configured to perform the ARE step of acknowledging or recognizing a plurality of subnetworks that may be extracted from a whole network. In this case, each subnetwork may include a plurality of nodes (e.g., routers R) and may be represented by a tunnel group having a plurality of end-to-end tunnels through the respective subnetwork. The processing device 92 may also select a first group of subnetworks from the plurality of subnetworks and then generate an RL agent for each subnetwork of the first group. Each RL agent may be based on observations of end-to-end metrics of the end-to-end tunnels of the respective subnetwork. Also, the observations are essentially independent of specific topology information of the respective subnetwork. The processing device 92 may then train a global model based on the RL agents of the first group of subnetworks and apply the global model to the ARE, which may be configured for recommending actions that can be taken by a network engineer to improve a state of the whole network.

According to some embodiments, the processing device 92 may be configured, before applying the global model to the ARE, to test the global model on a second group of subnetworks selected from the plurality of subnetworks. Based on the testing of the global model, the processing device 92 may be configured to tune or retrain one or more of the RL agents and/or the global model as needed. The processing device may also perform the steps of a) matching the remaining subnetworks with the first group of subnetworks based on similarities in topology, and b) applying the RL agents of the first group of subnetworks to the remaining subnetworks that match the first group of subnetworks. The steps of training and testing may be performed on one or more of a real-world network, a virtual network, and a simulated network.

Figure 13:
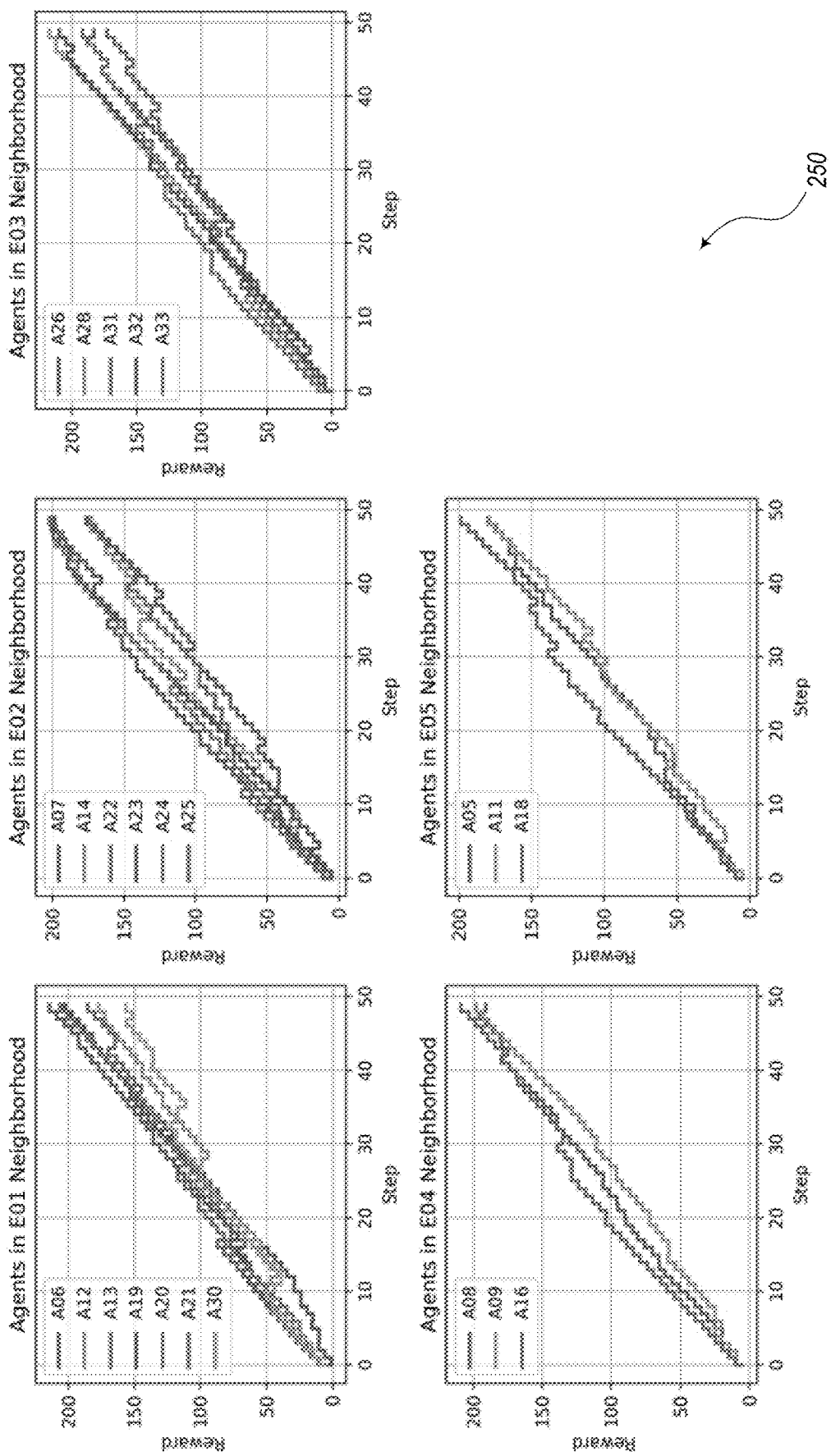
FIG. 13 is a collection of graphs illustrating RL rewards related to different neighborhoods in the network of FIG. 9 in which NOC-related training using a batch RL technique and zero-shot learning technique is performed, according to various embodiments.

The simulated environment, along with expert rules, may be used to generate data to train the RL agents. The simulated environment may be tested using one or both of the following scenarios:

Scenario #1: This scenario appears to provide better results than other scenarios, whereby test results are shown in FIG. 13. The expert rules are used to train the RL model using batch RL for a specific duration of 500,000 timesteps on a subset of the tunnel groups. Then, zero-shot transfer learning is performed for the large network. It can be seen that the reward increases consistently over time, indicating that the RL agent is able to perform well even on tunnel groups with topologies that were unseen during training, reaching reward values of over 150 by step 50 on all subnetworks.

Figure 12:
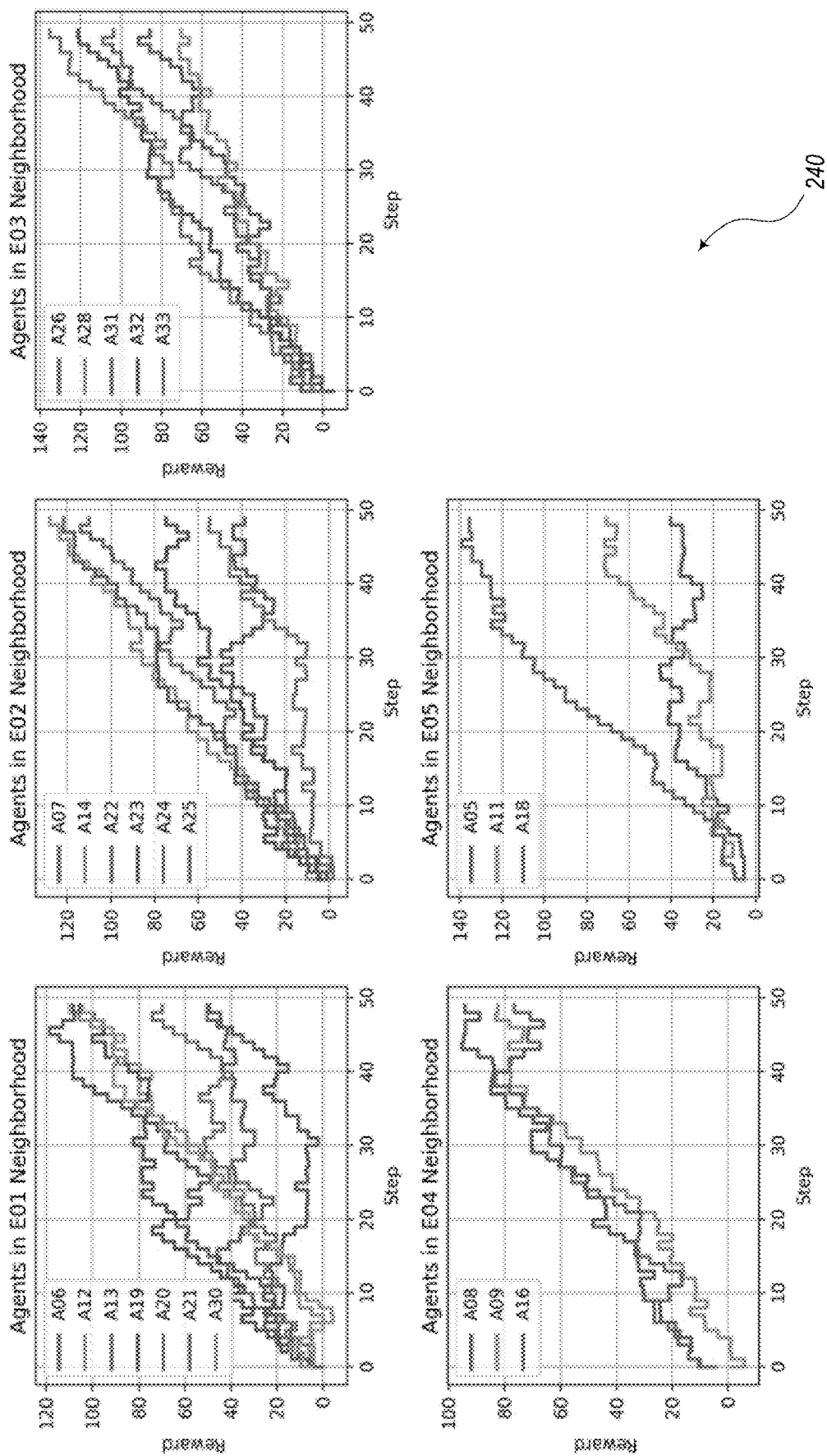
FIG. 12 is a collection of graphs illustrating RL rewards related to the different neighborhoods in the network of FIG. 9 in which training without batch RL procedures is performed, according to various embodiments.

Scenario #2: This scenario includes training individual RL agents on the large network for a specific duration of 500,000 timesteps using standard RL (i.e., not batch or offline RL). The results of this test are shown in FIG. 12, which is an improvement over conventional systems. The individually trained RL agents may not normally perform as well as Scenario #1, since many might be unable to reach a reward of 120 by step 50. This result indicates that the step of pre-training a single RL agent on multiple subnetworks lead to better performance than many individual agents trained on their own.

The action recommending program 104 or ARE 56 may be configured to use a simulated environment (e.g., network 21) along with expert rules to generate data to train the local RL agents for the subnetworks. The process of testing the network 210 or other prototypes may be implemented according to three different scenarios. The results are shown in FIGS. 11-13.

Figure 11:
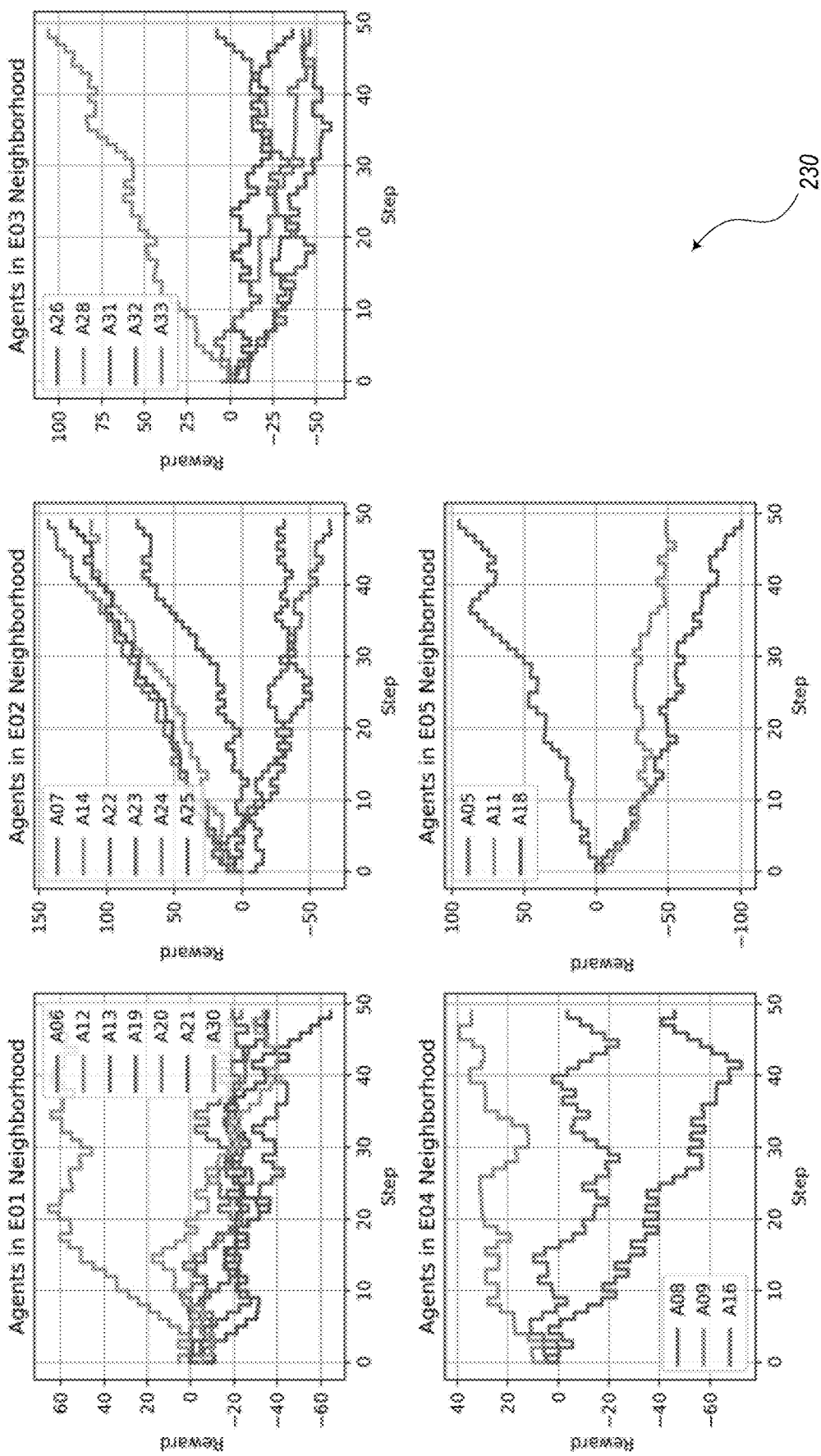
FIG. 11 is a collection of graphs illustrating RL rewards related to different neighborhoods in the network of FIG. 9 in which NOC-related training using a batch RL procedure is performed, according to various embodiments.

FIG. 11 is a collection of graphs 230 showing measurements of RL rewards over time. The graphs 230 show the results of different neighborhoods in the network 210 of FIG. 9. Specifically, the graphs 230 represent a technique in which NOC-related training is performed using a batch (offline) RL procedure. This may represent previous methodologies used in conventional systems. Unfortunately, as shown in some instances, the reward function actually decreases over the time steps, indicating the strategy does not advance to a better model.

FIG. 12 is a collection of graphs 240 showing measurements of RL rewards over time. The graphs 240 show the results of different neighborhoods in the network 210 of FIG. 9. Specifically, the graphs 240 represent a technique in which training on tunnel groups is performed without using a batch RL procedure. This represents an improvement over conventional systems and is similar to (method 2, scenario 2 . . . ?). It may be noted that the reward arises significantly over time.

FIG. 13 is a collection of graphs 250 showing measurements of RL rewards over time. The graphs 250 show the results of different neighborhoods in the network 210 of FIG. 9. Specifically, the graphs 250 represent a technique in which NOC-related training is performed using a batch RL procedure and a zero-shot learning technique. This shows the embodiments that, according to testing, provide the greatest increase in RL rewards in a relatively short amount of time. The graphs 250 show the result of testing the prototype of the network 210 using Scenario 1. Each curve shows the cumulative reward over 50 time steps for an individual agent acting on a single tunnel group of the large network. The agent is first trained using Batch RL, then copied to each tunnel group using zero-shot transfer learning.

Second Action-Recommendation Process

Figure 14:
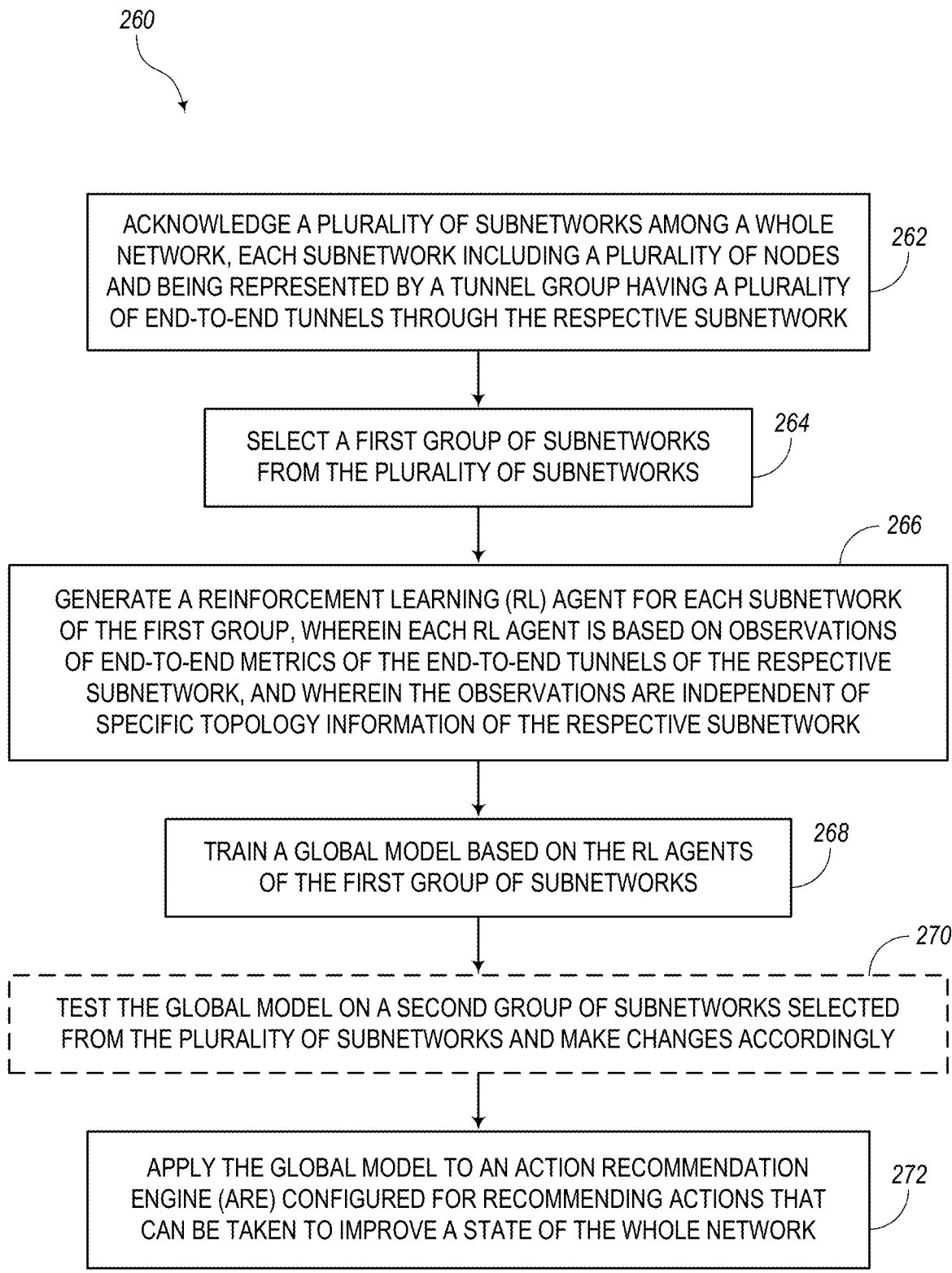
FIG. 14 is a flow diagram illustrating a process for training a global model for a whole network based on one or more RL agents of one or more subnetworks, according to various embodiments.

FIG. 14 is a flow diagram illustrating an embodiment of a process 260 for generating or training a global model for recommending actions in an entire network. The global model may be based on one or more local RL agents computed with respect to one or more subnetworks, each being associated with a tunnel group that include multiple tunnels. In some embodiments, the process 260 may be implemented in any suitable combination of hardware, software, and firmware. When implemented in software or firmware, the process 260 may be stored in non-transitory computer readable media (e.g., the memory device 92) and may include computer logic having instructions enabling or causing one or more processing devices or processors (e.g., processing device 92) to perform the process 260. For example, the process 260 may be part of the action recommending program 104 for recommending actions that a network engineer of a Network Operations Center (NOC) to take with respect to a network. The actions, for instance, may include switching one or more tunnels configured along one or more primary tunnels to one or more alternative, backup, or secondary tunnels to maximize traffic flow.

As illustrated in FIG. 14, the process 260 includes the step of acknowledging (or recognizing) a plurality of subnetworks among a whole network, as indicated in block 262. This step (block 262) may include virtually splitting up or dividing a network into multiple subnetworks. In this embodiment, each subnetwork includes a plurality of nodes and may be represented by a "tunnel group" having a plurality of end-to-end tunnels through the respective subnetwork. The process 260 also includes the step of selecting a first group of subnetworks from the plurality of subnetworks, as indicated in block 264. Next, the process 260 includes generating a Reinforcement Learning (RL) agent for each subnetwork of the first group, as indicated in block 266. Each RL agent, in this embodiment, is based on observations of end-to-end metrics of the end-to-end tunnels of the respective subnetwork. Also, the observations are independent of specific topology information of the respective subnetwork. The process 260 further includes the step of training a global model based on the RL agents of the first group of subnetworks, as indicated in block 268. In addition, the process 260 includes applying the global model to an Action Recommendation Engine (ARE) configured for recommending actions that can be taken to improve a state of the whole network, as indicated in block 272.

Before applying the global model to the ARE (block 272), the process 260 may further include the step of testing the global model on a second group of subnetworks selected from the plurality of subnetworks and make changes accordingly, as indicated in block 270. For example, based on the testing of the global model, the process 260 may be configured to tune or retrain one or more of the RL agents and/or the global model as needed. Furthermore, the process 260 may include the steps of a) matching the remaining subnetworks with the first group of subnetworks based on similarities in topology and b) applying the RL agents of the first group of subnetworks to the remaining subnetworks that match the first group of subnetworks. The steps of training and testing are performed on one or more of a real-world network, a virtual network, and a simulated network.

The observations described in block 266 may be based on one or more of tickets, logs, user feedback, expert rules, and simulator output. The step of generating the RL agent for each subnetwork (block 266) may include a) using one or more of an online RL technique and an offline RL technique and b) iterating the step of generating the RL agent one or more times based on additional observations of end-to-end metrics. In some embodiments, the end-to-end metrics described in block 266 may be related to Key Performance Indicator (KPI) metrics. Additionally, the end-to-end metrics may further be related to aggregated information associated with a topology of the respective subnetwork. The aggregated information, for example, may include a) the number of hops along each tunnel, b) the number of nodes along each tunnel, and/or c) the cost of transmitting data traffic along each tunnel. The global model, according to various embodiments, may be a decentralized RL model.

The process 260 of FIG. 14 may further include the step of providing the recommended action to a network engineer of a NOC that utilizes the ARE. With respect to each subnetwork, the end-to-end tunnels may be arranged from a client device to one or more servers associated with a video service provider. With respect to each of the one or more tunnel groups, the ARE may be configured to switch an end-to-end primary tunnel to an end-to-end secondary tunnel selected from one or more backup tunnels of the respective tunnel group in order to optimize traffic in the whole network. The whole network may include a training environment modeled as a Decoupled Partially-Observable Markov Decision Process (Dec-POMDP).

The observations that are independent of specific topology information may include observations independent of a) conditions of the nodes, b) conditions of links arranged between the nodes, and c) actions by other RL agents. The observations related to end-to-end metrics may include a) observations related to Quality of Service (QoS) metrics, b) delay, c) jitter, d) packet loss, e) Quality of Experience (QoE), f) bitrate, g) buffer level, h) startup delay, i) number of hops per tunnel, and/or j) number of nodes per tunnel. The step of training the global model (block 268) may include calculating an RL reward based on a Quality of Experience (QoE) metric and an operating expense (OPEX) metric. In some embodiments, the process 260 may include the steps of a) using the global model during inference or production in a real-world environment and b) using one or more of a tuning technique, a transfer learning technique, and a retraining technique to modify the global model as needed. Also, the training step (block 268) may include normalizing the RL agents such that the number of actions and the meaning of each action is kept consistent.

In a similar manner, another training procedure is defined as follows:
Step 1: Split the network topology into topology-agnostic subnetworks. Each RL agent would have only information about the end-to-end KPIs and, optionally, aggregated information about the topology. Examples of the aggregated information may include a) the number of hops along a path, b) the number of clients using a particular path, and c) the cost of moving traffic to a path. In this way, the observation space of the agent is agnostic to (or independent of) the specific topology of its subnetwork, and thus can potentially be applied to other topology-agnostic subnetworks within the larger network.
Step 2: Train a single "master" agent (or global model) on some subset of these subnetworks. The action space of the training subnetworks may be normalized such that the number of actions and the meaning of each action can be kept consistent. However, in some embodiments, this constraint may be skipped or omitted, particularly since it may not be necessary in certain deployment situations.

Sources of training data may include input coming from the field in the form of tickets, logs, and explicit user feedback (e.g., FIG. 7), which can be further augmented via a statistical simulator or can be generated by a discrete event simulator along with expert rules, manually entered actions, etc.

If using a simulator to generate data, random noise (e.g., background traffic) can be added on random hops to represent interactions with external actors (e.g., NOC or other automated agents) on the network. Also, if the number of subnetworks is high, the action space can be explored in parallel using multiple agents, then these interactions can be collected into a central dataset for training the master RL agent. This is often called "off-policy training," and may include, for example:
1. Exploring the action space or state space in parallel, depending on different learning approaches, such as:
  a. Traditional (online) RL—use multiple "worker" agents in parallel to explore the action and state space across all possible subnetworks,
  b. Batch (offline) RL—use mock NOC expert workers to interact with the simulator to generate action events, or
  c. a combination of a or b
2. Train a single "master" agent on all of these interactions
3. Iterate, depending on learning approach:
  a. Traditional (online) RL—after some number of iterations, copy this "master" agent to replace all of these multiple worker agents to reflect the latest policy.
  b. Batch (offline) RL—follow Method 2 from the previous ID to improve on expert rules. Note that even if the expert rules are sub-optimal, RL will learn that they result in non-optimal rewards, enabling RL to outperform the expert rules.

This is advantageous to SL (Method 1 in the previous ID) since SL only learns which actions were taken, rather than what the best actions to take actually are.

Step 3: Test the master agent on the remaining, unseen subnetworks to validate its performance.

Step 4: Copy the agent across all subnetworks. At this step, if the action space is identical between the training and test subnetwork, then the agent can be used as-is (zero-shot learning). However, if they differ, several strategies can be employed:
1. Tune the agent to new action space
  a. If there are any actions missing from the new action space, use action masking to mask the actions no longer applicable to this specific environment
  b. If actions have different meanings, perform reward shaping. In this case, one customizes the reward signal that the agent receives to align more closely with the new meaning of the action. This option only applies if the agent is allowed to continue learning in production.
  c. Replace the last layer of the policy network which encode the actions, reusing the features learned by the actor. This requires less data than relearning from scratch.
2. Train a new agent from scratch on new environment and action space.

As the network changes and new tunnel groups arise, transfer learning from the pre-existing agent can be used to fine-tune to the new pattern, without any need to re-train a new agent from scratch.

Figure 15:
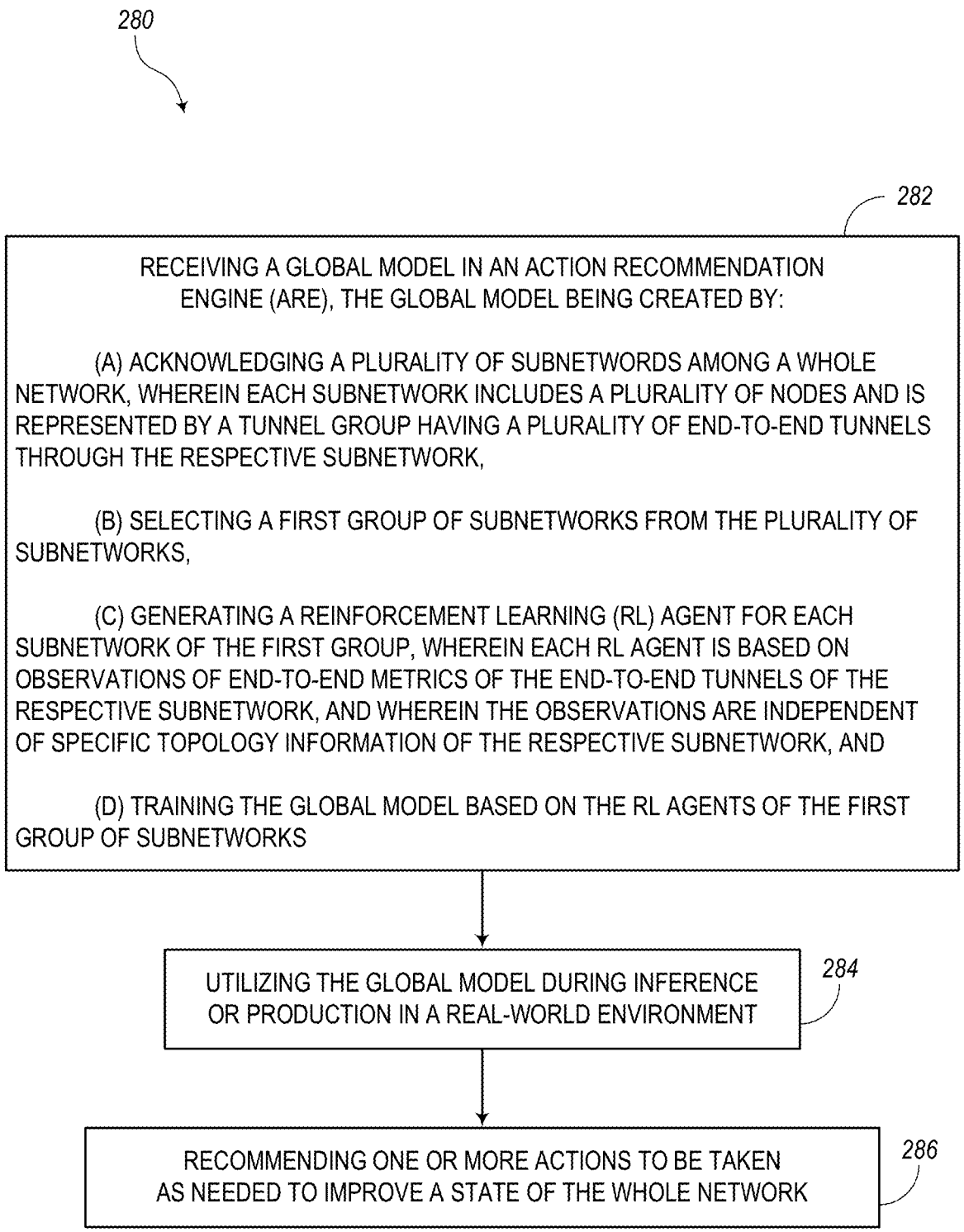
FIG. 15 is a flow diagram illustrating a process for utilizing a trained global model during inference for recommending actions to improve the state of the whole network, according to various embodiments.

FIG. 15 is a flow diagram illustrating an embodiment of a process 280 for utilizing a trained global model during inference or production. The global model may be used for recommending actions to improve the state of the whole network. Similar to the process 260 of FIG. 14, the process 280 of FIG. 15 may be implemented in a non-transitory computer-readable medium and executed by a processing device. As illustrated, the process 280 includes receiving a global model in an Action Recommendation Engine (ARE), as indicated in block 282. The global model, similar to FIG. 14, is created by (a) acknowledging a plurality of subnetworks among a whole network, where each subnetwork includes a plurality of nodes and is represented by a tunnel group having a plurality of end-to-end tunnels through the respective subnetwork, (b) selecting a first group of subnetworks from the plurality of subnetworks, (c) generating a Reinforcement Learning (RL) agent for each subnetwork of the first group, wherein each RL agent is based on observations of end-to-end metrics of the end-to-end tunnels of the respective subnetwork, and wherein the observations are independent of specific topology information of the respective subnetwork, and (d) training the global model based on the RL agents of the first group of subnetworks. The process 280 further includes the step of utilizing the global model during inference or production in a real-world environment, as indicated in block 284. Next, the process 280 includes the step of recommending one or more actions to be taken as needed to improve a state of the whole network, as indicated in block 286.

Therefore, the embodiments of the present disclosure may include certain points of novelty with respect to conventional system. Generally, the systems, methods, and computer-readable media are able to scale ARE to large networks using distributed RL. Specifically, the scaling procedure may include splitting the network into subsets of topology-agnostic subnetworks. These subnetworks may take the form of tunnel groups. In some embodiments, this splitting may be done at the transport layer. Also, a single agent can be pre-trained using the ARE framework of the previous ID on multiple subsets of the network simultaneously, then copied across all subnetworks for inference, tuning as needed.

Furthermore, the systems and methods may have other advantages over conventional systems. Generally, the systems and methods of the present disclosure can make an ARE RL agent agnostic to specific network topology. That is, the techniques may observe only end-to-end metrics and aggregated information about the subnetwork topology. Also, the techniques may either normalize action space amongst topologies or re-tune to new action space as needed. Another advantage is that the present systems and methods can ensure that an ARE RL agent is resilient against changes to the network topology. For example, the present techniques may use transfer learning to fine-tune the pre-trained ARE RL agent to new topologies, if needed.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:
1. A non-transitory computer-readable medium configured to store computer logic having instructions that, when executed, enable a processing device to perform the steps of:
  acknowledging a plurality of subnetworks among a whole network, each subnetwork including a plurality of nodes and being represented by a tunnel group having a plurality of end-to-end tunnels through the respective subnetwork;
selecting a first group of subnetworks from the plurality of subnetworks;
generating a Reinforcement Learning (RL) agent for each subnetwork of the first group, each RL agent based on observations of end-to-end metrics of the end-to-end tunnels of the respective subnetwork, the observations being independent of specific topology information of the respective subnetwork;
training a global model based on the RL agents of the first group of subnetworks; and
applying the global model to an Action Recommendation Engine (ARE) configured for recommending actions that can be taken to improve a state of the whole network.

2. The non-transitory computer-readable medium of claim 1, wherein, before applying the global model to the ARE, the instructions further enable the processing device to test the global model on a second group of subnetworks selected from the plurality of subnetworks.

3. The non-transitory computer-readable medium of claim 2, wherein, based on the testing of the global model, the instructions further enable the processing device to tune or retrain one or more of the RL agents and/or the global model as needed.

4. The non-transitory computer-readable medium of claim 2, wherein the instructions further enable the processing device to perform the steps of:
matching remaining subnetworks with the first group of subnetworks based on similarities in topology; and
applying the RL agents of the first group of subnetworks to the remaining subnetworks that match the first group of subnetworks.

5. The non-transitory computer-readable medium of claim 2, wherein the steps of training and testing are performed on one or more of a real-world network, a virtual network, and a simulated network.

6. The non-transitory computer-readable medium of claim 1, wherein the observations are based on one or more of tickets, logs, user feedback, expert rules, and simulator output.

7. The non-transitory computer-readable medium of claim 1, wherein the step of generating the RL agent for each subnetwork includes:
using one or more of an online RL technique and an offline RL technique; and
iterating the step of generating the RL agent one or more times based on additional observations of end-to-end metrics.

8. The non-transitory computer-readable medium of claim 1, wherein the global model is a decentralized RL model.

9. The non-transitory computer-readable medium of claim 1, wherein the end-to-end metrics are related to Key Performance Indicator (KPI) metrics.

10. The non-transitory computer-readable medium of claim 9, wherein the end-to-end metrics are further related to aggregated information associated with a topology of the respective subnetwork.

11. The non-transitory computer-readable medium of claim 10, wherein the aggregated information includes one or more of the number of hops along each tunnel, the number of nodes along each tunnel, and the cost of transmitting data traffic along each tunnel.

12. The non-transitory computer-readable medium of claim 1, wherein the instructions further enable the processing device to provide the recommended action to a network engineer of a Network Operations Center (NOC) that utilizes the ARE.

13. The non-transitory computer-readable medium of claim 1, wherein, with respect to each subnetwork, the end-to-end tunnels are arranged from a client device to one or more servers associated with a video service provider.

14. The non-transitory computer-readable medium of claim 1, wherein, with respect to each tunnel group, the ARE is configured to switch an end-to-end primary tunnel to an end-to-end secondary tunnel selected from one or more backup tunnels of the respective tunnel group in order to optimize traffic in the whole network.

15. The non-transitory computer-readable medium of claim 1, wherein the whole network includes a training environment modeled as a Decoupled Partially-Observable Markov Decision Process (Dec-POMDP).

16. The non-transitory computer-readable medium of claim 1, wherein the observations that are independent of specific topology information include observations independent of a) conditions of the nodes, b) conditions of links arranged between the nodes, and c) actions by other RL agents.

17. The non-transitory computer-readable medium of claim 1, wherein the observations related to end-to-end metrics include one or more observations related to Quality of Service (QoS) metrics, delay, jitter, packet loss, Quality of Experience (QoE), bitrate, buffer level, startup delay, number of hops per tunnel, and number of nodes per tunnel.

18. The non-transitory computer-readable medium of claim 1, wherein the step of training the global model includes calculating an RL reward based on a Quality of Experience (QoE) metric and an operating expense (OPEX) metric.

19. The non-transitory computer-readable medium of claim 1, wherein the instructions further enable the processing device to:
use the global model during inference or production in a real-world environment; and
use one or more of a tuning technique, a transfer learning technique, a zero-shot learning technique, and a retraining technique to modify the global model as needed.

20. A non-transitory computer-readable medium configured to store computer logic having instructions that, when executed, enable a processing device to:
receive a global model in an Action Recommendation Engine (ARE), the global model created by
acknowledging a plurality of subnetworks in a whole network, each subnetwork including a plurality of nodes and being represented by a tunnel group having a plurality of end-to-end tunnels through the respective subnetwork,
selecting a first group of subnetworks from the plurality of subnetworks,
generating a Reinforcement Learning (RL) agent for each subnetwork of the first group, wherein each RL agent is based on observations of end-to-end metrics of the end-to-end tunnels of the respective subnetwork, and wherein the observations are independent of specific topology information of the respective subnetwork, and
training the global model based on the RL agents of the first group of subnetworks,
utilize the global model during inference or production in a real-world environment; and recommend one or more actions to be taken as needed to improve a state of the whole network.

\* \* \* \* \*